United States Patent
Liu et al.

(10) Patent No.: US 11,421,914 B2
(45) Date of Patent: Aug. 23, 2022

(54) THERMAL STORAGE SYSTEM WITH COUPLED TANKS

(71) Applicants: UT-Battelle, LLC, Oak Ridge, TN (US); University of Tennessee Research Foundation (UTRF), Knoxville, TN (US)

(72) Inventors: Xiaobing Liu, Oak Ridge, TN (US); Ming Qu, West Lafayette, IN (US); Joseph K. Warner, San Jose, CA (US); Liang Shi, West Lafayette, IN (US)

(*) Notice: Subject to any disclaimer, the term of this patent is extended or adjusted under 35 U.S.C. 154(b) by 0 days.

(21) Appl. No.: 17/434,264

(22) PCT Filed: Mar. 13, 2020

(86) PCT No.: PCT/US2020/022602
§ 371 (c)(1),
(2) Date: Aug. 26, 2021

(87) PCT Pub. No.: WO2020/209979
PCT Pub. Date: Oct. 15, 2020

(65) Prior Publication Data
US 2022/0042718 A1    Feb. 10, 2022

Related U.S. Application Data

(60) Provisional application No. 62/819,755, filed on Mar. 18, 2019.

(51) Int. Cl.
*F28D 20/02* (2006.01)
*F24H 4/04* (2006.01)
(Continued)

(52) U.S. Cl.
CPC ............. *F24H 4/04* (2013.01); *F25B 30/02* (2013.01); *F28D 20/0034* (2013.01); *F28D 20/021* (2013.01); *F28D 2020/0082* (2013.01)

(58) Field of Classification Search
CPC ............... Y02E 60/14; F28D 20/021; F28D 2020/0082; F25B 30/02
See application file for complete search history.

(56) References Cited

U.S. PATENT DOCUMENTS

| | | | | |
|---|---|---|---|---|
| 5,680,898 A | * | 10/1997 | Rafalovich | ............ F24F 5/0017 165/236 |
| 2009/0012651 A1 | * | 1/2009 | Lifson | ..................... G06Q 50/06 700/276 |
| 2012/0125019 A1 | | 5/2012 | Sami | |

FOREIGN PATENT DOCUMENTS

| DE | 102012106910 A1 | * 10/2013 | ......... F28D 20/0043 |
|---|---|---|---|
| FR | 2 991 439 | 12/2013 | |
| GB | 2 039 027 | 7/1980 | |

OTHER PUBLICATIONS

International Search Report and Written Opinion for PCT/US2020/022602, dated Nov. 4, 2020, 19 pages.
(Continued)

*Primary Examiner* — Eric S Ruppert
(74) *Attorney, Agent, or Firm* — Klarquist Sparkman, LLP

(57) ABSTRACT

Methods and apparatus are disclosed for high-efficiency thermal storage with a fluid-filled "battery" tank positioned within a fluid-filled "reservoir" tank. Fluid loops couple the tanks to a heat pump and a building. The heat pump can charge the battery tank or deliver thermal energy (cold or heat) to a building, using the reservoir tank or ambient air as a thermal energy source. The battery tank can discharge energy to the building jointly with the heat pump or, at periods of peak electricity usage, with the heat pump switched off. Operating modes allow significant savings in electricity usage and mitigate the "duck curve." Low duty cycle usage of the reservoir enables efficient underground thermal storage with less digging than conventional geo- (Continued)

thermal technologies. Additional efficiency is achieved with phase change materials installed inside a tank or in a tank wall, providing temperature regulation. Control methods are disclosed.

10 Claims, 19 Drawing Sheets

(51) Int. Cl.
*F25B 30/02* (2006.01)
*F28D 20/00* (2006.01)

(56) References Cited

OTHER PUBLICATIONS

Liu et al., "Innovative Low-Cost Ground Heat Exchanger for Geothermal Heat Pump Systems", available from https://www.energy.gov/sites/default/files/2018/05/151/32226h_Liuz_050118-1130.pdf, pp. 1-20, Aug. 2018.

Liu et al., "Innovative Low-Cost Ground Heat Exchanger for Geothermal (Ground Source) Heat Pump Systems", available from https://www.energy.gov/sites/default/files/2019/05/f62/bto-peer%E2%80%932019-ornl-low-cost-ground-hx-geothermal.pdf, pp. 1-21, Apr. 2019.

Liu et al., "A Preliminary Study of a Novel Heat Pump Integrated Underground Therman Energy Storage for Shaping Electric Demand of Buildings", 2019 GRC Annual Meeting & Expo—Palm Springs, California, available from https://www.osti.gov/biblio/1606946, pp. 1-17, Sep. 2019.

Warner et al., "A novel shallow bore ground heat exchanger for ground source heat pump applications—Model development and validation", Applied Thermal Engineering, vol. 164 (2020), No. 114460, pp. 1-12, Sep. 2019.

Zhang et al., "A three-dimensional numerical investigation of a novel shallow bore ground heat exchanger integrated with phase change material", Applied Thermal Engineering, vol. 162 (2019), No. 114297, pp. 1-11, Aug. 2019.

\* cited by examiner

THERMAL STORAGE SYSTEM WITH COUPLED TANKS

CROSS REFERENCE TO RELATED APPLICATIONS

This is the U.S. National Stage of International Application No. PCT/US2020/022602, filed Mar. 13, 2020, which was published in English under PCT Article 21(2), which in turn claims the benefit of U.S. Provisional Application No. 62/819,755, entitled "DUAL PURPOSE UNDERGROUND THERMAL BATTERY" and filed on Mar. 18, 2019, the content of which is incorporated herein by reference in its entirety.

ACKNOWLEDGMENT OF GOVERNMENT SUPPORT

This invention was made with government support under Contract No. DE-AC05-00OR22725 awarded by U.S. Department of Energy. The government has certain rights in the invention.

BACKGROUND

Energy efficiency continues to be of vital interest. A significant use of energy is for heating and cooling of buildings. Heat pumps and geothermal extraction have been used for decades, but conventional technologies suffer from high installation cost, and lack of flexibility to shift electricity demands, and accordingly have seen limited deployment. Conventional technologies also consume significant amounts of electricity even during peak use periods.

Accordingly, there remains ample opportunity for improved technologies that address various ones of these problems and provide thermal energy to buildings.

SUMMARY

Apparatus and methods are disclosed for efficient delivery of heat or cold to a building using coupled thermal storage tanks. In some examples of disclosed systems, an inner tank is a thermal battery, configured to receive thermal energy from a heat pump and provide thermal energy to a building or other load, while an outer tank is a thermal reservoir, positioned to receive thermal energy lost from the thermal battery, and coupled as an energy source to an input of the heat pump. In additional examples, phase change materials can be incorporated for temperature regulation or for increased thermal storage capacity. Example disclosed systems can operate in multiple modes to suit changing conditions.

In certain examples, the disclosed technologies can be implemented as a system comprising a thermal battery and a heat pump. The heat pump is coupled to receive energy from a thermal reservoir and to provide energy to a building. The thermal battery is coupled to receive energy from the heat pump and to provide energy to the building. The thermal battery is also coupled to transfer energy to or from the thermal reservoir.

In some examples, the thermal battery and the thermal reservoir can include respective water tanks. The thermal battery can be surrounded by the thermal reservoir. The thermal reservoir can be positioned underground. A coupling between the thermal battery and the building can bypass the heat pump. The heat pump can a dual-source heat pump configured to selectively receive energy from the thermal reservoir or from ambient air. In other examples, the dual-source heat pump can be configured to receive a continuously variable mixture of energy from the thermal reservoir and from ambient air.

In additional examples, a first fluid loop can couple the thermal reservoir to a heat exchanger within the heat pump. A second fluid loop can couple the heat pump, the thermal battery, and the building.

In further examples, a member separating the thermal battery and the thermal reservoir can incorporate a phase change material. The phase change material can have a critical temperature between 1° C. and 10° C. above or below a mean undisturbed ground temperature at a site of the system and at a median depth of the thermal reservoir. The thermal battery can incorporate fluid and a device surrounded by the fluid, and the device can incorporate a phase change material. The heat pump can be reversible between first and second states. In the first state, the heat pump can be configured to provide cooling fluid to the building. In the second state, the heat pump can be configured to provide heating fluid to the building.

In certain examples, a method can be implemented covering at least three modes of operation of the disclosed technologies. In a first mode, a heat pump is used to provide energy to a building and to a thermal battery. In a second mode, energy is provided from the thermal battery to the building. In a third mode, the heat pump is used to provide thermal energy from a thermal reservoir to the building. The thermal reservoir is situated to receive energy from underground earth and from the thermal battery.

In varying examples, the energy can be cold or heat. In the first mode, the heat pump can be controlled to variably or selectively receive energy from the thermal reservoir and from ambient air. Also in the first mode, the heat pump can provide energy simultaneously to the building and to the thermal battery. In further examples, the heat pump can provide energy alternately to the building and to the thermal battery in the first mode.

In additional examples, the method can include detecting that an amount of stored energy in the thermal battery exceeds a threshold. Responsive to the detecting, delivery of energy from the heat pump to the thermal battery can be stopped. The detecting can include determining a deviation between a fluid temperature of the thermal battery and a critical temperature of a first phase change material of the thermal battery, and determining that the deviation exceeds a threshold. Alternatively or additionally, the temperature of the thermal reservoir can be regulated with a second phase change material separating the thermal reservoir and the thermal battery.

In further examples, the available energy within the thermal battery can be determined to be below a threshold. Responsive to the determining, the second mode can be terminated.

Any of the above methods can be implemented as one or more computer-readable media storing instructions which, when executed by one or more hardware processors, cause a system comprising the one or more hardware processors, the heat pump, the thermal battery, and the thermal reservoir to perform such method.

In certain examples, the disclosed technologies can be implemented as a method covering at least three time periods. For a first time period, a first determination is made that an energy load is less than a capacity of a heat pump. Based on the first determination, one or more fluid loops are configured to provide energy from the heat pump to the energy load and to a thermal battery during the first time period. A second determination is made that a second time period is a period of peak electricity usage. Responsive to the second determination, the one or more fluid loops are configured to provide energy from the thermal battery to the energy load during the second time period. For a third time period, a third determination is made that available energy in the thermal battery is below a threshold. Responsive to the third determination, the one or more fluid loops are configured to provide energy from the heat pump to the energy load during the third time period.

In some examples, the first, second, and third time periods can be distinct time periods during one 24-hour day. The one 24-hour day can be a first day, the energy load can be a cooling load on the first day, and the method can also include repeating the determinations and configurations for the first, second, and third time periods on a second day different from the first day, when the energy load is a heating load.

In additional examples, the determinations for the first and third time periods can be performed during the first and third time periods respectively. The configuration for the second time period can include configuring the heat pump to be off. The configuration for the third time period can include configuring the one or more fluid loops to disable energy transfer to or from the thermal battery during the third time period.

In further examples, the energy load can be a cooling load or a heating load, and the method can also include determining, for a case that the energy load is a cooling load, that an ambient air temperature is above a first threshold, or, for a case that the energy load is a heating load, that an ambient air temperature is below a second threshold. Responsive to this determining, the one or more fluid loops can be configured to provide energy from an underground thermal reservoir to the heat pump during the first time period or the third time period.

In some examples, the method can also include determining, during the first time period, that a charge state of the thermal battery is above a threshold. Responsive to this determination, the one or more fluid loops can be reconfigured to disable energy transfer to the thermal battery for a subsequent portion of the first time period.

In additional examples, the method can also include determining, during the second time period, that a charge state of the thermal battery is below a threshold. Responsive to this determining, the one or more fluid loops can be reconfigured, for a subsequent portion of the second time period, to disable energy transfer from the thermal battery to the energy load and to enable energy transfer from the heat pump to the energy load.

Any of the above methods can be implemented as one or more computer-readable media storing instructions which, when executed by one or more hardware processors, cause a system comprising the one or more hardware processors, the heat pump, the thermal battery, and the fluid loops to perform such method.

In certain examples, the disclosed technologies can be implemented as an apparatus having a first tank surrounded by a second tank. A first thermal regulator in the first tank incorporates a first phase change material having a first critical temperature. A second thermal regulator, positioned to be in thermal contact with a medium occupying the second tank, incorporates a second phase change material having a second critical temperature different from the first critical temperature.

In some examples, the second thermal regulator can be positioned within a wall separating the first and second tanks. In other examples, the second thermal regulator can be positioned to be wholly immersed within the medium occupying the second tank.

In further examples, the first and second critical temperatures can be at respective designed operating temperatures of the first and second tanks. The apparatus can be configured for installation at sites having mean underground temperatures, at an installed median depth of the apparatus, within a target temperature range. The target temperature range can be between the first and second critical temperatures.

In additional examples, a third thermal regulator within the first tank can incorporate a third phase change material having a third critical temperature. The first and third critical temperatures can be selected for cold storage and heat storage modes of operation respectively. A fourth thermal regulator can be positioned to be in thermal contact with a medium occupying the second tank. The fourth thermal regulator can incorporate a fourth phase change material with a fourth critical temperature. The second and fourth critical temperatures can be selected for cold delivery and heat delivery modes of operation of the apparatus, respectively.

The foregoing and other objects, features, and advantages of the disclosed technologies will become more apparent from the following detailed description, which proceeds with reference to the accompanying figures.

DETAILED DESCRIPTION

Figure 1:
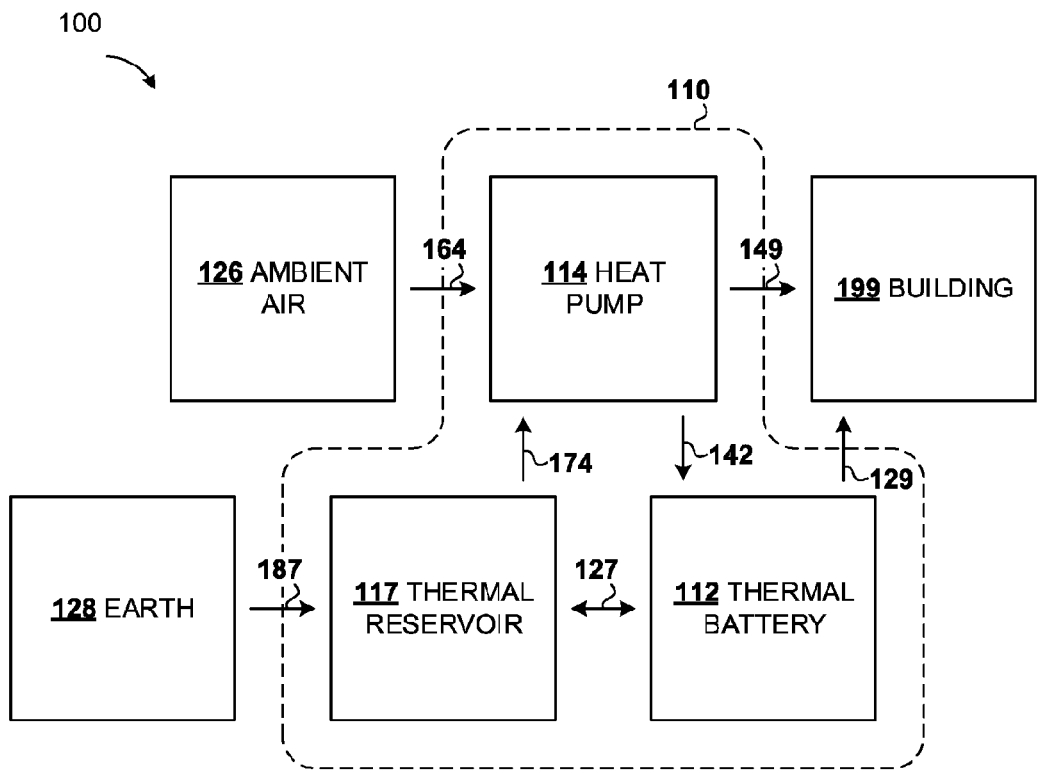
FIG. 1 is a block diagram of an example system deployment according to the disclosed technologies.

This disclosure is set forth in the context of representative embodiments that are not intended to be limiting in any way.

I. Introduction

Demand for electricity continues to grow, in part due to recent trends for electrifying transportation systems. However, the limited capacity of existing electrical grids and intermittent outputs from rapidly growing renewable power generation (e.g., solar or wind) create new challenges for stable and efficient grid operation. For example, electrical generators can be required to ramp up quickly when renewable power supplies drop (e.g., when the sun sets, or the wind stops). Buildings are the primary users of electricity: an estimated 75% percent of all U.S. electricity is consumed within buildings, and building energy use drives 80% of peak demand for electricity. Because about 40-70% of building electricity usage is for thermal loads—including space heating, space cooling, and water heating—provisioning buildings with thermal energy storage has the potential to provide local energy cost savings at the building level, and additional system-wide benefits at the grid level.

Some technologies and systems disclosed herein integrate a dual tank underground thermal store with a dual source heat pump to provide a range of operating modes suitable for efficient delivery of thermal energy across a wide range of conditions encountered over the course of a day, from day to day, and across the seasons. A tank acting as a thermal battery can store thermal energy when it is advantageous to produce thermal energy with a heat pump, and can discharge the thermal energy without using the heat pump when electricity usage is high. Thereby electricity usage can be leveled over the course of a day. Particularly, disclosed systems can be controlled to counteract the duck curve effect and reduce electricity demand when, for example, renewable electricity sources go offline. A reservoir tank can operate as a low duty cycle geothermal source, providing energy more efficiently than with an air source heat pump or other conventional space heating and space cooling systems. The reservoir tank can provide an additional benefit of recycling energy lost from the thermal battery. Because of low duty cycle operation, a disclosed system can be installed with significantly less drilling or digging than conventional geothermal technologies. Overall, such a system design is favorably positioned for large scale adoption, for improved efficiency of electric grid operations and mitigation of undesirable duck curve effects. Further enhancement of efficiency and capacity can be obtained by incorporating phase change materials (PCM) into one or both tanks.

II. Terminology

To facilitate review of the various embodiments, the following explanations of terms are provided. Occasionally, and where clear to a person of ordinary skill in the relevant art from the context, a term may also be used in a different meaning.

As used in this disclosure, "ambient air" is outdoor air proximate to disclosed equipment. Ambient air can be available as a source of energy for e.g. a disclosed heat pump. Ambient air can also receive energy lost from a building or other disclosed equipment.

As used in this disclosure, a "building" is an outdoor structure having walls and a roof around an interior space. Some examples of buildings include homes (such as single-family homes, multitenant housing, or apartments), public or commercial premises (such as offices or institutions), industrial facilities (such as factories), or storage facilities (such as garages or warehouses). Buildings are examples of "loads" to which energy can be provided with the disclosed technologies.

As used in this disclosure, "earth" refers to any material found below ground level. Earth can include soil, rock, fill, refuse, water or another fluid, or man-made material such as concrete, in any combination.

As used in this disclosure, "energy" refers to thermal energy in any of various forms. Energy can be described as "cold" or "heat," wherein cold provided to an object is an alternate description of heat being removed from the object, and cold removed from an object is an alternate description of heat being provided to the object. Energy can be delivered to and stored in a material, and energy can be extracted from such material. Such operations can change the energy content of the material, which can be realized as a change in temperature of the material, or a change in a phase of the material. The material can be part of a storage apparatus, part of a building or other target object, part of a fluid loop used to transport energy, or part of the environment. In some examples of the disclosed technology, energy can be provided to a building. The building can utilize such energy for various purposes including space heating, air conditioning (space cooling), hot water, or chilled water, in varying combinations. Forms of energy other than thermal are referred to by specific terms such as "electricity" and, like thermal energy, can be denoted in Btu, kWh, or similar units.

As used in this disclosure, "fluid" refers to a material that flows, such as a liquid or a gas. Some fluids of interest in this disclosure include: water, refrigerants, ethylene glycol, phase change materials (in liquid or gas states), and ambient air; mixtures of such fluids; or such fluids with solutes, particulates, or other admixed constituents.

As used in this disclosure, a "fluid loop" is a path over which a fluid is transported, from one apparatus or component, to another apparatus or component, and back. All or part of a fluid loop can commonly be enclosed in one or more pipes, tubes, or other channels. A fluid loop can be coupled to one or more heat exchangers thereby to transport energy from one or more energy source apparatuses to one or more energy load apparatuses. Some fluid loops can be closed loops, in which fluid is not added or lost during normal operation. Other fluid loops can have, e.g. intake and discharge ports in a reservoir whose content can vary over time, and can be termed open loops.

As used in this disclosure, a "heat pump" is a machine that transfers heat energy from a cooler source to a warmer load, or equivalently transfers cold energy from a warmer source to a cooler load. A heat pump can rely on electricity or a fuel for operation. A heat pump can have a capacity, which can be measured in units of power, such as Btu/hour or kW, indicating a maximum rate at which the heat pump can deliver energy to a load. A heat pump can include a compressor-driven fluid loop coupling a condenser (at which cold is absorbed from an energy source or heat is discharged toward an energy load) with an evaporator (at which heat is absorbed from an energy source or cold is discharged toward an energy load). In some examples of the disclosed technology, the heat pump can be reversible, so that two apparatuses on the fluid loop can exchange roles of condenser and evaporator, and a direction of heat flow can be reversed.

As used in this disclosure, "mean temperature" refers to a year-round mean temperature at a particular site. The mean temperature can be an air temperature or a ground temperature. Particularly, a "mean underground temperature" can be a year-round mean temperature at a vertical midpoint of a disclosed reservoir tank installed underground at a site. A "mean undisturbed underground temperature" can be used for design, and can be the mean underground temperature at a test location geographically and geologically similar to a target installation site, and distant from other structures or equipment that could influence the underground temperature at the test location.

As used in this disclosure, "peak" can refer to a daily or seasonal maximum of any quantity related to providing energy to a load. Such example quantities can include a temperature (ambient, target in a building, or present in disclosed equipment), an amount of energy (available, consumed, transferred, or demanded), or a cost (unit price; or a net cost, which can be the product of a unit price times a number of consumed units).

As used in this disclosure, a "phase change material" (PCM) is a material used to absorb or release energy while undergoing a phase change at a particular temperature (dubbed the "critical temperature") during normal operation of disclosed equipment. For example, water absorbs energy when melting at 0° C. or releases energy when freezing at 0° C. The energy absorbed or released at the critical energy is termed "latent heat." The phase change can be between different states of matter (e.g. solid↔liquid) or between e.g. different crystalline forms of a same (solid) state. A PCM can absorb or release energy at other temperatures according to its specific heat and temperature change. Some examples of PCMs (e.g., a mixture of two or more different PCMs) can have two or more critical temperatures within operating temperature range of disclosed equipment.

As used in this disclosure, "recharge" refers to a process of restoring energy drawn down from an energy source. Recharge can be "active," through operation of a machine (for example by operating a fluid loop to deliver energy to the energy source), or "passive," without operation of a machine (for example by conduction from material surrounding the energy source). In some examples, active recharge of a thermal battery can result in passive recharge of a surrounding thermal reservoir. Related words "charge" and "discharge" refer to processes of adding or extracting energy from an energy store.

As used in this disclosure, a "refrigerant" is a fluid used to transfer energy from a source to a load, and that experiences a change of state during the energy transfer. For example, a refrigerant can absorb heat while transforming from liquid to gas in an evaporator, and can release heat while transforming from gas to liquid in a condenser. However, the use of a refrigerant in a fluid loop is not a requirement: some disclosed fluid loops can use water or another fluid that maintains a single phase (i.e. no phase change) over an operating temperature range of the fluid loop.

As used in this disclosure, a first object is said to "surround" a second object if the solid angle subtended by the second object at a centroid of the first object is greater than $2\pi$ (50% solid angle coverage). Particularly, the second object need not enclose the first object on all sides.

As used in this disclosure, a "tank" is a receptacle for holding an energy storage material. In some examples, disclosed tanks are operated with water or a PCM inside, however this is not a requirement, and other mixtures of solids, fluids, or PCMs can also be used.

As used in this disclosure, "temperature regulation" refers to maintaining substantially constant temperature while transferring energy into or out of an energy store. In examples, temperature regulation can be achieved through incorporation of a PCM within the energy store; through having an energy store that is very large compared to the amount of energy transferred; or through providing a compensating energy transfer out of or into the energy store so that the net energy transfers cancel out.

As used in this disclosure, a "temperature regulator" can refer to an object containing a PCM.

As used in this disclosure, "thermal batteries" and "thermal reservoirs" are energy storage devices which can be charged (e.g. by actively or passively delivering energy to the battery) and discharged (by extracting energy from the battery or by a loss mechanism). In some examples, a thermal battery can be actively charged and discharged, and can experience some passive discharge to its surroundings. In some examples, a thermal reservoir can be actively discharged and passively recharged.

As used in this disclosure, "underground" refers to any location below a nearest ground surface level. While many underground locations are directly below earth material, this is not a requirement, as a basement location within a building can also be underground.

III. A First Example System

FIG. 1 is a block diagram 100 of an example system deployment according to the disclosed technologies. The deployed system 110 operates in an environment of ambient air 126 and earth 128 to efficiently provide energy (heat or cold) to a building 199. Arrows in FIG. 1 denote exemplary paths for energy transfer in normal modes of operation.

The deployed system 110 includes a thermal battery 112, a thermal reservoir 117, and a heat pump 114. Thermal battery 112 and thermal reservoir 117 can be two thermally coupled tanks operable to exchange energy as indicated by arrow 127. In examples, thermal battery 112 can be an inner tank surrounded by an outer tank of thermal reservoir 117. Energy transfer 127 can occur through conduction across a wall separating the inner and outer tanks 112, 117. Additionally, thermal reservoir can be passively recharged by earth 128 as indicated by arrow 187.

Heat pump 114 can source energy from one or both of ambient air 126 or thermal reservoir 117, as indicated by arrows 164, 174 respectively, and can be a dual-source heat pump. In alternative examples, a single source heat pump, or two single source heat pumps can be used. Heat pump 114 can consume electricity and can deliver energy to one or both of thermal battery 112 and building 199, as indicated by arrows 142, 149 respectively. The amount of energy delivered by heat pump 114 can exceed the amount of energy received from sources 126, 117. The amount of energy delivered by heat pump 114 can exceed the amount of electricity consumed.

Thermal battery 112 can be actively charged from the heat pump 114 via pathway 142, and can discharge energy to building 199 via pathway 129. In an example operating mode, pathway 129 can operate with the heat pump 114 switched off, which can provide benefit for reducing electricity usage during periods of peak electricity consumption. In other operating modes, pathways 129, 149 can be operational concurrently, so that energy requirements of building 199 can be jointly provided from battery 112 and via heat pump 114, as described further herein.

Numerous variations can be employed. In some embodiments, separate heat pumps 114 can be used for air input 164 and for reservoir input 174. In further embodiments, separate heat pumps 114 can be used for each load 149, 142. In some embodiments, a reversible heat pump 114 can support both cooling and heating of the building 199, while in other embodiments, separate heat pumps can be used for heating and cooling.

Furthermore, the energy transfer arrows in FIG. 1 are illustrative. Embodiments of the disclosed technologies can omit one or more of the depicted arrows. For example, air intake 164 from ambient air could be omitted and the heat pump 114 could always source energy from thermal reservoir 117. Additionally, other energy transfer paths can also be present. For example, building 199 can lose energy to ambient air 126 or earth 128 (paths not shown), and ambient air 126 and earth 128 can exchange energy (path not shown).

In some examples, system 110 can be tasked with providing space heating and space cooling (air conditioning) to building 199, which can utilize the common equipment depicted. In other examples, system 110 can further be tasked with providing energy for hot or chilled water in conjunction with energy for space heating or cooling. Because the energy volumes and required temperatures for water and air delivery can be significantly different, portions of system 110 can be replicated in parallel to support multiple energy uses, each according to the principles of the disclosed technologies.

Energy pathway 127 can serve to recapture energy lost from thermal battery 112 to thermal reservoir 117, and in some examples, the energy transfer 127 can be entirely or predominantly in this direction. In other examples, the thermal battery can be sufficiently drained by energy transfer 129 to cause some reverse energy flow from reservoir 117 to battery 112. Reverse energy flow can depend on design operating points of the system 110, or on particular variations due to weather or energy demand on a particular day.

IV. An Example Method

Figure 2:
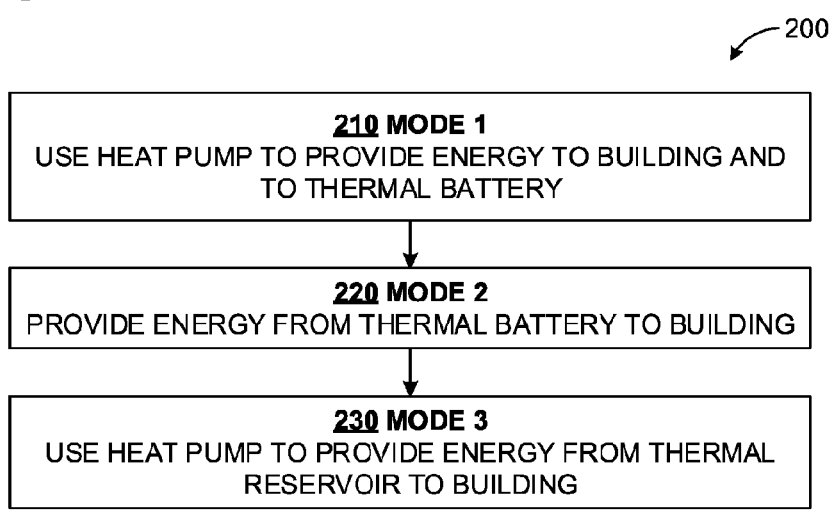
FIG. 2 is a flowchart illustrating exemplary multi-mode operation of the disclosed technologies.

FIG. 2 is a flowchart 200 illustrating exemplary multi-mode operation of the disclosed technologies. Operation in three modes is described, each mode operating in a respective portion of a daily cycle, with the cycle substantially repeating from one day to the next in a given season. The illustrated method can be performed with a system similar to 110, with any of the other systems or apparatuses described herein, or with other equipment.

At process block 210, the system is operated in a first mode. A heat pump (similar to heat pump 114) can be used to provide energy to a building (similar to building 199) and to a thermal battery (similar to battery 112). This mode can be suitable early in the morning in a summer season, when ambient air is cool, cooling demand is low, and heat pump capacity exceeds the energy demand of the load building.

At process block 220, the system is operated in a second mode. Energy can be provided from the now-charged thermal battery to the building. This mode can be suitable in the afternoon hours, when heat pump capacity is insufficient to meet energy demand, the electricity cost to operate a heat pump is high, or the heat pump efficiency is below a threshold. The threshold can vary with time of day or other conditions. In some conditions, the threshold can be set to 100% to force the system to operate in the second mode.

At process block 230, the system is operated in a third mode. The heat pump can source energy from a thermal reservoir (similar to 117) and deliver energy to the building. This mode can be suitable in late evening hours, when the thermal battery is depleted (i.e. available energy in the battery below a threshold), electricity cost is below peak, or the thermal reservoir is cooler than the ambient air. The third mode can offer recycling of energy lost (by a path similar to 127) from the battery. In this way, overall efficiency can be improved compared to a system with no reservoir, or compared to a system with remote or uncoupled tanks for the reservoir and the battery.

These modes cover a number of energy pathways of a system. However, additional modes can also be used. For example, the first mode can be split into two modes 1A (using ambient air as an energy source) and 1B (using the thermal reservoir as an energy source). Mode 1A can be implemented earlier in the morning, and mode 1B can be implemented subsequently when ambient air has heated up. Similarly, the second mode can be split into three modes: 2A (with heat pump on, drawing on ambient air), 2B (with heat pump on, drawing on the thermal reservoir), and 2C (with heat pump off). Modes 2A or 2B can be implemented early in the afternoon, before a peak electricity usage period, to reserve available battery capacity for mode 2C later in the afternoon when electricity usage peaks. Mode 2C can bypass the heat pump. Still further a recharge mode can utilize thermal reservoir as an energy source for the heat pump to recharge the thermal battery, without delivering energy to the building. While these modes have been described for a space cooling application, similar modes can be employed for a heating application in winter. The precise choice of modes can vary depending on design operating points of a disclosed system, on the particular operating conditions (e.g. weather, energy demand, or incoming state of the system after one or more previous days) on a particular day. In particular, under mild weather conditions, the system can be idled for portions of a day. Under conditions of large temperature fluctuations, the system can be run in a heating mode during the night and in a cooling mode in the afternoon.

The modes described above can be controlled by software instructions executed on a hardware processor. For example, execution of first instructions, second instructions, or third instructions can cause the system to operate respectively in Mode 1 (or either of Modes 1A or 1B), Mode 2 (any of Modes 2A-2C), or Mode 3.

V. An Example Dual Tank Apparatus

Figure 3:
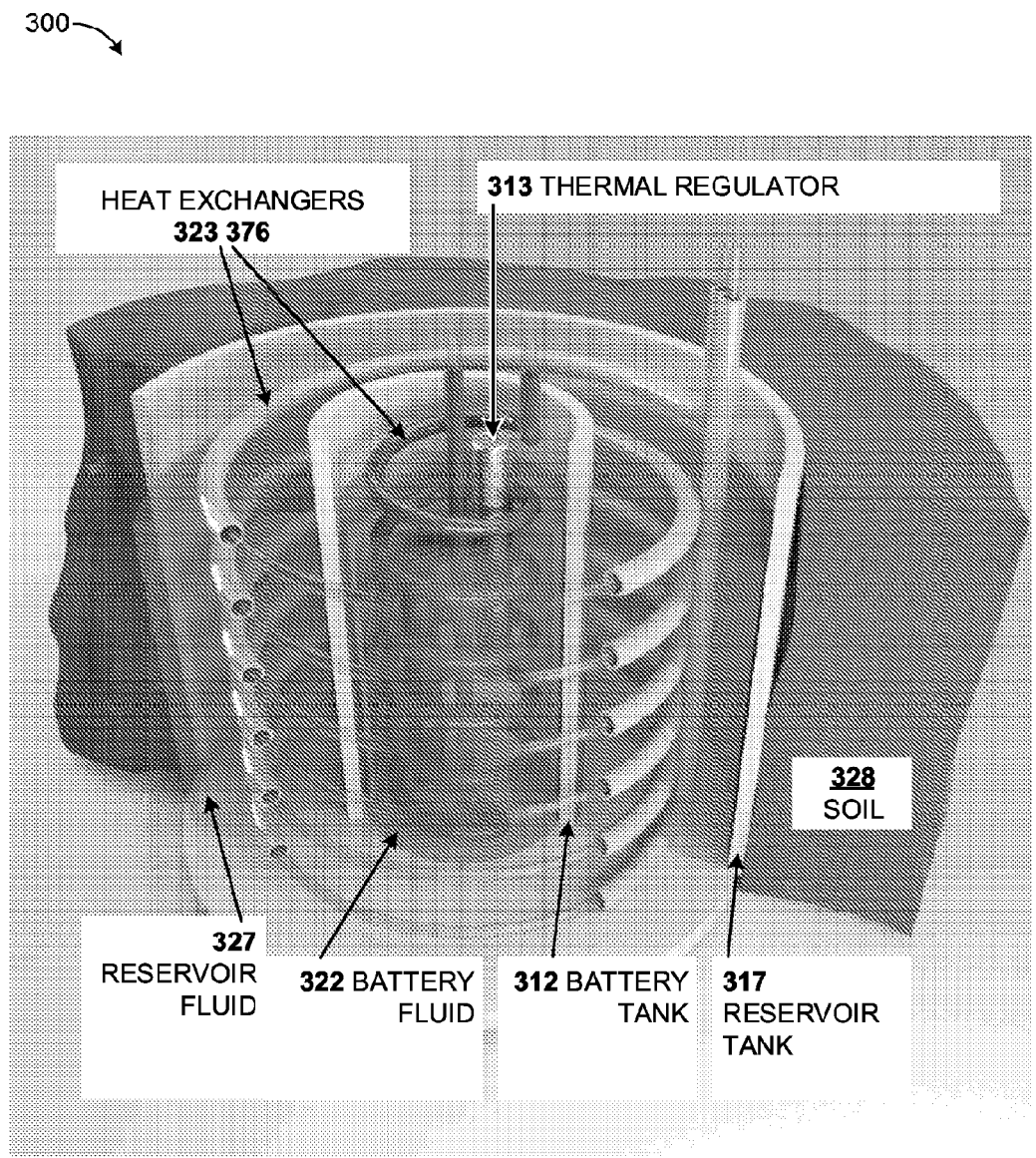
FIG. 3 is a cutaway view of an example dual tank embodiment of the disclosed technologies.

FIG. 3 is a cutaway view of an example dual tank embodiment 300 of the disclosed technologies. In this example, concentric battery and reservoir tanks are installed underground. Inner tank 312 is shown filled with a fluid 322 and can act as a thermal battery. Heat exchanger 376 forms part of a fluid loop through which energy can be delivered to the battery fluid 322, or through which energy can be extracted for delivery to a building or other load. Outer tank 317 is shown filled with a fluid 327 and can act as a thermal reservoir. Heat exchanger 323 forms part of a fluid loop through which energy can be provided to a heat pump as described herein. Outer tank 317 can passively recharge from soil 328. Passive recharge of outer tank 317 can also occur by recapture of energy lost by inner tank 312 through the walls separating the tanks 312, 317.

FIG. 3 also shows a thermal regulator 313 located within the inner tank 312. The illustrated regulator 313 is in the form a column of PCM, however other shapes and implementations of PCM can also be used.

FIG. 3 shows closed fluid loops, where battery fluid 322 and reservoir fluid 327 are kept separate from the fluids within heat exchangers 376, 323 respectively. However, this is not a requirement. In some examples, one or both of these fluid loops can be implemented as an open loop. For example, heat exchanger 376 can be replaced by an inlet port and outlet port (in further examples, at different heights within the tank 312), so that the entire column of fluid 322 replaces the spiral coil 376. A similar arrangement can be utilized in place of heat exchanger 323.

The design particulars of a tank apparatus 300 will vary depending on local climate, size of a building being served, soil conditions, or other factors. For conditions encountered at a representative location in Tennessee, U.S., an inner tank with 45 cm inner diameter and 6 m height can be used. The concentric outer tank can have 76 cm inner diameter and also 6 m height. In other examples, tank heights can range from 5-10 m, from 2-20 m, from 1-50 m, or over another similar range. Inner tank diameters can range from 20-50 cm, from 10-100 cm, from 5-200 cm, or over another similar range. Outer tank diameters can vary from 50-100 cm, from 10-200 cm, or from 5-500 cm, or over another similar range. The volume of PCM used in thermal regulator 313 can be about 0.1 $m^3$ in the Tennessee example. In other examples, the PCM volume can be in a range from 0.05-0.2 $m^3$, from 0.02-0.5 $m^3$, from 0.01-1.0 $m^3$, or over another similar range.

At some sites, water with its high specific heat can be used as the fluid for either tank or either heat exchanger. At other sites, freezing of the fluid loop can be a concern, and ethylene glycol or another antifreeze mix can be used within the heat exchangers. Liquids other than water can also be used as either battery fluid 322 or reservoir fluid 327.

The tanks 312, 317 are shown as having a common bottom for simplicity of illustration. In some examples, the bottom of tank 312 can be raised off the floor of tank 317 with supports, so as to reduce energy leakage from the apparatus 300. Furthermore, the tanks of apparatus 300 are illustrated as concentric cylinders having vertical axes, however these are not requirements. In other examples, the tanks can be rectangular, spheroidal, or another shape, and can be mounted with offset axes, or at another orientation such as horizontal, according to a design strategy or site requirements. Still further, any of the walls of tank 312 can incorporate PCM to enhance the system performance as described herein.

In another variation, a single reservoir tank 317 can surround multiple distinct battery tanks 312. The multiple battery tanks can serve different floors or different portions of a load building, or can serve distinct dwellings, offices, or buildings in a multi-tenant building or a community development.

VI. A Second Example System

Figure 4:
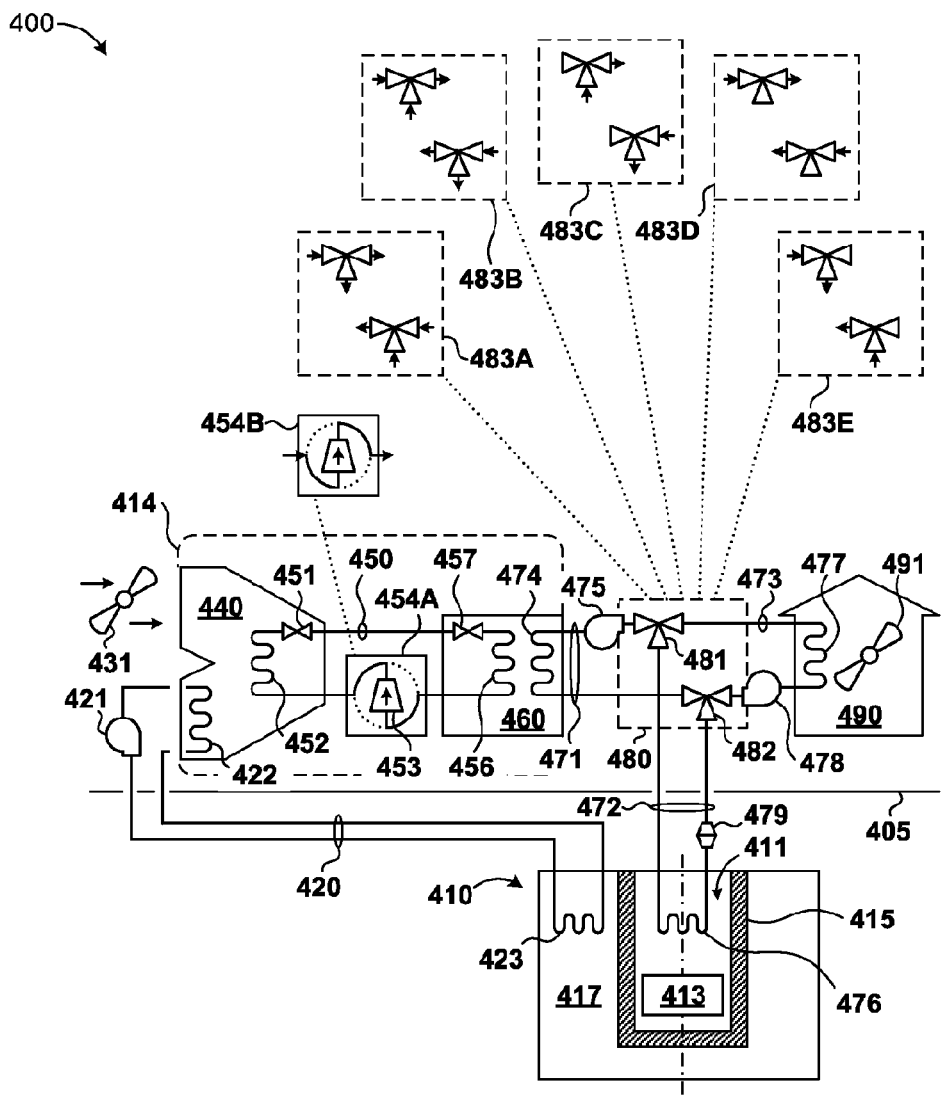
FIG. 4 is a schematic diagram of an example system according to the disclosed technologies.

FIG. 4 is a schematic diagram of an example system 400 according to the disclosed technologies. System 400 can be reconfigured for different operating modes, or for different applications (e.g. cooling or heating).

1. Operation in a Cooling Application

System 400 can be described initially for a cooling application. System 400 can provide cold energy to a building 490 with a heat pump 414 and a coupled tank assembly 410 similar to those described in context of FIG. 1. The components of system 400 can be coupled by fluid loops and heat exchangers.

The heat pump 414 can be a dual source heat pump comprising a condenser 440, a compressor 453, and an evaporator 460, coupled among themselves by a fluid loop 450. The condenser 440 can have a pair of cold source ports. One port can receive ambient air driven by fan 431, while the other port can receive cold from thermal reservoir 417 via fluid loop 420, driven by pump 421. Condensation of a working fluid (e.g. a refrigerant) in loop 450 can cause the working fluid to absorb cold from either ambient air or the thermal reservoir.

In the cooling application, compressor 453 is coupled to fluid loop 450 through a four-way valve which can be switched between configurations 454A (for cooling) and 454B (for heating), as illustrated. In the cooling configuration 454A, the compressor 453 can drive a working fluid clockwise (as seen in FIG. 4) through loop 450. Compressor 453 can be a variable speed compressor to provide an efficient operating point for heat pump 414 for given operating conditions. In some examples, cool air from a fan such as 491 can be provided for space cooling at about 13° C., or in a range of about 10-16° C., or about 5-21° C. That is, the compressor 453 can receive low-pressure fluid as input from evaporator 460 and can provide compressed fluid to condenser 440. Coils 456, 474 form a heat exchanger that can warm the fluid in coil 456 with heat extracted from a load building 490. Heated fluid is transported (right to left in FIG. 4) from evaporator 460 to condenser 440, where it can be cooled and condensed in coil 452. Coil 452 can be cooled by a working fluid from loop 420 with coils 422, 452 coupled as a heat exchanger, or can be cooled by ambient air blown into condenser 440 by fan 431. Returning from condenser 440 to evaporator 460 (left to right in FIG. 4) along the upper arm of loop 450, the fluid can be evaporated in coil 456 after reducing pressure through expansion valves 451, 457. The evaporated fluid (in gas form) returns to the inlet of compressor 453. In this mode of operation, heat from building 490 flows right to left from evaporator 460 to condenser 440, or cold from a source flows left to right from condenser 440 to evaporator 460.

Another fluid loop is formed by three fluid pathways 471-473: fluid pathway 471 to and from condenser 460; fluid pathway 472 to and from a thermal battery 411; and fluid pathway 473 to and from a load building 490. The pathways can be coupled by three-port valves 481, 482 to support various operating modes, as illustrated by insets 483A-483E. Working fluid in these pathways can be driven by pumps 475, 478, 479. Pump 479 is optional and can be a reversible pump. Any one or more of these pumps or pump 421 can be a variable speed pump. At evaporator 460, warm fluid can enter coil 474 on the lower branch of fluid pathway 471, where it can absorb cold through heat exchange with coil 456, and cool fluid can be pumped out the top branch of pathway 471 by pump 475. At the load building, cold fluid can enter on the upper branch of pathway 473, can deliver cold to the load building via coil 477, and warm fluid can be pumped out the lower branch of pathway 473 by pump 478. At the thermal battery 411, in some modes of operation, cold fluid from evaporator 460 can flow counterclockwise from valve 481 through fluid pathway 472 and heat exchange coil 476 to valve 482. In such modes, the thermal battery 411 can be recharged with cold. In other modes of operation, warm fluid from building 490 can flow clockwise from valve 482 through fluid pathway 472 and heat exchange coil 476 to valve 481. In such modes, the thermal battery 411 can be discharged to provide cold to the load building 490.

2. Three-Way Valve Assembly

Valve assembly 480, (incorporating valves 481, 482) or pumps 475, 478, 479 can control which of pathways 471, 472, 473 are active (i.e. with working fluid flowing through the pathway) in various configurations. Some configurations of valve assembly 480 are illustrated by insets 483A-483E.

In configuration 483A, all valves can be open, pumps 475, 478 can be on, and pump 479 can be activated for counterclockwise (battery recharge) fluid transport in pathway 472. Thus, the heat pump 414 can simultaneously provide cold to both building 490 and thermal battery 411.

In configuration 483B, all valves can be open, pumps 475, 478 can be on, and pump 479 can be activated for clockwise (battery discharge) fluid transport in pathway 472. Thus, heat pump 414 and thermal battery 411 can both simultaneously provide cold to building 490.

In configuration 483C, pathway 471 can be disabled either by closing its valve ports or by switching pump 475 off, while pathways 472, 473 can be active, with clockwise flow in pathway 472. Thus, the thermal battery 411 can discharge cold to the building 490, without involvement of heat pump 414.

In configuration 483D, pathways 471, 473 can be active, while pathway 472 can be disabled either by closing its valve ports or by switching pump 479 off. Thus, the heat pump 414 can provide cold to building 490, without involvement of the thermal battery 411.

In configuration 483E, pathway 473 can be disabled either by closing its valve ports or by switching pump 478 off, while pathways 471, 472 are active, with counterclockwise flow in pathway 472. Thus, the heat pump 414 can recharge thermal battery 411, without any energy transfer to or from the building 490.

In some examples configurations such as 483A-483B can be implemented by alternating or multiplexed operations of simpler configurations 483C-483E. For example, alternating between configurations 483D, 483E can allow heat pump 414 to provide energy to building 490 and battery 411, similar to the operation of configuration 483A. By varying the duty cycle of configurations 483D, 483E, the allocation of energy between battery 411 and building 490 can be precisely controlled. Similarly, alternating between configurations 483C, 483D can allow both heat pump 414 and battery 411 to provide energy to building 490, similar to the configuration 483B. As an alternative to variable duty cycles, valves 481, 482 with variable apertures can be used, to allocate energy flow between any combination of heat pump 414, battery 411, and building 490.

3. Operation in a Heating Application

Configurations of the heat pump 414 and fluid pathways 471-473 for a heating application can be similar. However, because a heating application can involve heat flowing left to right from a heat source, through heat pump 414, to building 490, the configuration of heat pump 414 can be reversed from a cooling configuration. Particularly, configuration 454B of the four-way valve can be used, so that compressor can drive the working fluid (refrigerant) counterclockwise through loop 450. Thus, in a heating application, apparatus 440 can act as an evaporator, absorbing heat from ambient air or coil 422, while apparatus 460 can act as a condenser. Warm fluid can be evaporated after going through expansion valve 457, 451 and can release heat as it condenses in coil 460. The released heat can be transferred to coil 474 and thence transferred to building 490 or battery 411.

4. Coupled Tank Assembly

Turning to the coupled tank assembly 410, thermal battery 411 and thermal reservoir 417 can be tanks containing respective fluids (such as water) and can be separated by a wall or interface 415. Heat exchanger 423 and fluid loop 420 can provide energy from thermal reservoir 417 to heat exchanger 422, 452 within heat pump 414. Heat exchanger 476 and fluid pathway 472 can transport energy from heat pump 414 to recharge battery 411, or can transport energy toward building 490 while discharging battery 411. The dual tank assembly can be installed underground, allowing for passive recharge of the thermal reservoir 417 from earth. A PCM device 413 can be provided within the battery 411, which can serve as a temperature regulator. The interface 415 between battery 411 and reservoir 417 can also incorporate PCM. In examples, the critical temperature of PCM in interface 415 can be in between the fluid temperatures of tanks 411, 417. Thus, the PCM in interface 415 can have a moving phase changing boundary until the entire PCM is fully melted or fully solidified. In a cooling application, the PCM can be in a solid state on the battery side of the phase boundary and can be in a liquid state on the reservoir side of the phase boundary. PCM within interface 415 can be used to regulate the temperature of the thermal reservoir 417. As the battery or the reservoir are charged or discharged, the phase boundary can move inward (toward the battery side of interface 415) or outward (toward the reservoir side of interface 415).

Numerous variations can be employed. Within building 490, FIG. 4 shows heat exchange coil 477 coupled to a fan 491, which can be a blower for a forced air system of space heating or cooling. However, this is not a requirement. In other examples, coil 477 can be coupled to water plumbing to heat or pre-heat a hot water supply, or to cool or pre-cool a chilled water supply. Coil 477 can also be part of, or coupled to, radiator units within the building 490. The pathways 471-473 are illustrated as sharing a common working fluid, but this is not a requirement. In other examples, separate fluid loops can be implemented for one or more of the energy pathways between condenser 460, battery 411, and building 490. Evaporator 440 can be implemented as a single structure having dual ports for air or ground energy sources, or alternatively as two separate evaporators. In some examples, air source via fan 431 can be omitted from evaporator 440. In some examples, the air and ground sources can be variably mixed, such as by speed control of fan 431 or pump 421, so that evaporator 440 can simultaneously use energy from both sources.

VII. An Example Daily Cycle for Cooling

Figure 5A:
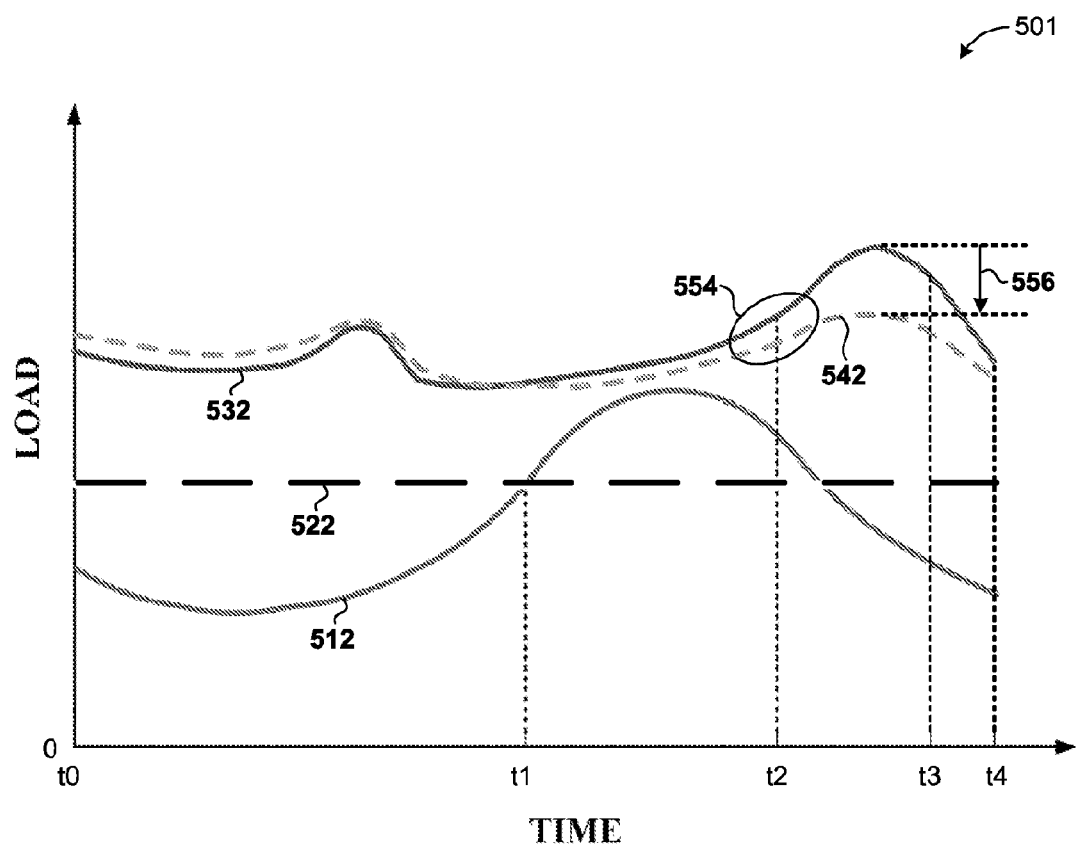
FIGS. 5A-5B are charts illustrating an example daily cycle in a cooling application of the disclosed technologies.
Figure 5B:
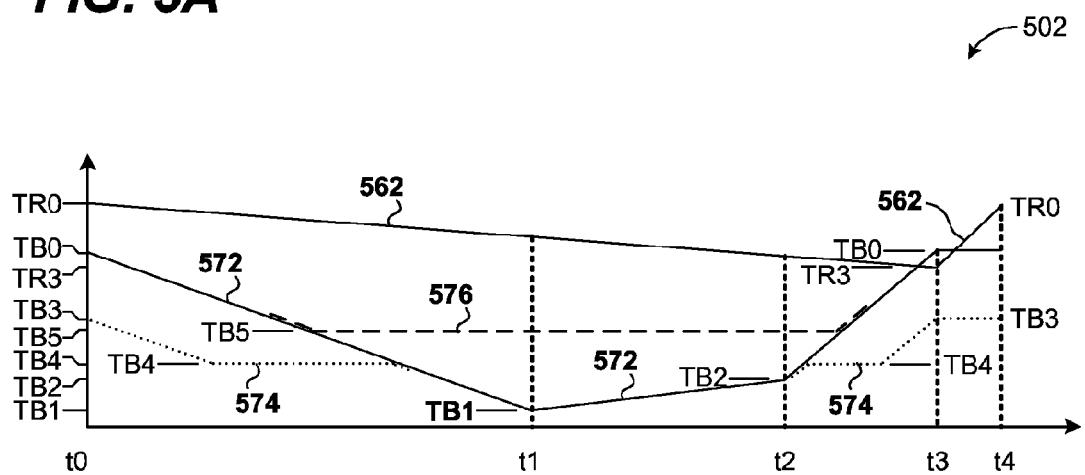

FIGS. 5A-5B are charts 501, 502 illustrating an example daily cycle in a cooling application of the disclosed technologies. Chart 501 illustrates various energy or electricity quantities over an example summer day, while chart 502 illustrates temperatures within a thermal battery and a thermal reservoir over the example day. The charts can be applied to an example system similar to 110 or 400, the former comprising a heat pump 114 coupled to a thermal battery 112 and a thermal reservoir 117.

Starting with FIG. 5A, the time axis represents one 24 hour calendar day, such as from one midnight (t0) to an immediately following midnight (t4). This day is divided into four intervals by time markers t1, t2, t3. Graph 512 represents demand by a building for cold energy, measured in e.g. Btu/hr or kW, while graph 522 represents energy capacity available from a heat pump. For simplicity of illustration, graph 522 depicts a case with the heat pump receiving energy from a thermal reservoir having nearly constant temperature over the day, and providing energy to a building in which the target temperature setpoint is also constant. With input and output temperatures constant, the heat pump capacity is also constant as shown in graph 522. However, this is not a requirement, and in other examples the heat pump capacity can vary over the course of the day. For example, the heat pump capacity receiving cold energy from ambient air can have higher capacity when the ambient air is cooler, or when the building temperature is warmer.

Graph 532 shows total electricity usage for the building using conventional air-conditioning technology, with an air source heat pump or an air-conditioner, while dashed line graph 542 shows total electricity usage for the building equipped with a cooling system as described herein. Graphs 532, 542 include all electricity usage serving the building which, in addition to a cooling system, can include computers, appliances, lighting, battery chargers, as well as other uses.

The time intervals of charts 501, 502 will be described together. Chart 502 has the same horizontal axis as chart 501, and has two primary graphs 562, 572 respectively depicting temperatures within a thermal reservoir and a thermal battery over this day, for an example operating sequence.

During the first interval (t0,t1), the heat pump has capacity 522 exceeding the cold demand 512 of a load building. To illustrate, t0 can be at about midnight, and t1 can be at about 10 am, although these times can vary greatly from one deployment or one day to another. The heat pump can be operated to deliver cold to both the thermal battery and the building, similar to that described for process block 210. As shown by graph 572 the temperature of the thermal battery falls from TB0 to TB1 in this time interval. Graph 562 shows the temperature of thermal reservoir gradually decreasing from TR0 by passive recharge from surrounding earth and by conduction losses from the cooler thermal battery.

In the second interval (t1,t2), the heat pump capacity 522 is insufficient to meet the cold demand 512 of the building, and the heat pump and the thermal battery can be used together to provide cold to the building. In the third interval (t2,t3), electricity usage 532 peaks, and the thermal battery can continue to provide cold to the building, albeit with the heat pump turned off to reduce electricity consumption. To illustrate, t2 and t3 can be about 4:30 pm and about 8:00 pm respectively, although both can vary significantly. Both time intervals can be serviced as described for process block 220. Particularly, the second interval (t1,t2) can be similar to mode 2A or 2B of FIG. 2, while third interval (t2,t3) can be similar to mode 2C. As shown by graph 572, the temperature of the thermal battery rises slowly during the second time interval to TB2 as some cold is extracted from the battery, and rises more rapidly during the third time interval to TB3 as the battery provides cold at a higher rate than during the second time interval. Graph 562 shows the thermal reservoir continuing to recharge slowly and reaching temperature TR3.

Turning to the fourth interval (t3,t4), which can represent an early part of the night from 8 pm to midnight, the system can be operated in a mode similar to mode 3 of process block 230. With thermal battery depleted, and away from the time of peak electricity usage, the heat pump can draw on the thermal reservoir to provide cold to the building. As cold is withdrawn from the reservoir, its temperature 562 rises from a minimum of TR3 to TR0. The thermal battery is idle during this interval, and its temperature 572 can remain substantially constant.

For simplicity of illustration, graphs 512, 562, 572 are shown returning, at t4, to the same values as t0. However, this is not a requirement. Because of changing weather conditions or changing load requirements, the cold demand 512 at t4 can differ from that at t0. Also, the operation of an illustrated cooling system can have a net increase or net reduction of energy over a particular one-day cycle. For example, cold storage can be increased on a day with high temperature of 30° C. in anticipation of high temperatures of 35° C. on a subsequent day. Conversely, cold storage can be drawn down on a 35° C. day, in anticipation of lower cold demands on a subsequent 30° C. day.

Further, the example of chart 502 has at least one of the thermal battery or thermal reservoir being charged or discharged during all phases of operation. However, this is not a requirement. In other examples, both the thermal battery and the thermal reservoir can be idle for one or more time periods of a day. When idle, a thermal battery or thermal reservoir can be subject to passive heat transfer, e.g. by conduction to or from the surroundings, however the directly coupled fluid loops or fluid pathways can be idle. Particularly, and with reference to FIG. 4, thermal battery 411 can be idle when the valves 480 are in configuration 483D or pump 479 is off, e.g. while heat pump 414 is actively providing energy to the load 490. Similarly, thermal reservoir 417 can be idle when fluid flow in loop 420 is halted (e.g. pump 421 off), while heat pump 414 is receiving energy from fan 431. Idling can be suitable on days of low energy demand from the load 490; at times of peak electricity usage; when the thermal battery or thermal reservoir is fully charged; or for duty cycle control of a disclosed system, Charts 501, 502 also demonstrate numerous benefits of the disclosed technologies.

1. Reduction in Electricity Usage

Comparing electricity usage of the illustrated disclosed system (graph 542) with a conventional system (graph 532), it is seen that electricity usage increases slightly in the first time interval, due to usage of the heat pump for charging the thermal battery. In the second time interval, a conventional system would require greater heat pump capacity to meet cold requirements. With the thermal battery able to provide supplementary cold, a lower capacity heat pump can cause electricity usage to drop.

In the third time interval, electricity usage can drop significantly. With no heat pump employed, the electricity usage 542 by the disclosed system can be largely that required to pump fluid in a fluid loop similar to 472 and 473, and considerably less than that the electricity usage 532 by a conventional system. The peak electricity demand reduction 556 significantly reduces electricity usage and electricity cost for a single building, and can have even greater impact for an electricity grid when the disclosed technology is widely deployed. Finally, in the fourth time interval some reduction in electricity use can be achieved with a ground source heat pump as compared to an air source heat pump.

2. Mitigation of Duck Curve

A further benefit can be derived in the vicinity of t2. The duck curve has been a recognized concern in modern electricity grids, where renewable energy contributions can go offline quickly, leading to a steep rise in electricity demand from e.g. conventional electricity sources. The disclosed technologies allow a cooling system to suddenly drop its electricity usage by switching a heat pump off at t2 (e.g. transitioning to mode 2C from mode 2A or 2B), which counteracts the duck curve caused by other participants on an electricity grid. Still further, as a managed tool, the ability to shut off significant numbers of heat pumps, without compromising on cold delivery to associated buildings, can be a powerful tool for grid management.

3. Reduction in Surface Area Required for Geothermal Heat Exchange

Turning to graph 562, a still further advantage of the disclosed technology can be explained. The cold drawn from the thermal reservoir over a fairly short interval (t3, t4) can be replenished (e.g. by passive recharge) over a much longer time interval (t0, t3). Passive recharge of the reservoir can occur both from surrounding earth and from an enclosed thermal battery. Conventional ground heat exchange systems can be limited in capacity by surface area and poor thermal conductivity of typical earth, requiring a large amount of drilling or digging, which represents a large capital cost for such systems. In contrast, the thermal reservoir of the disclosed technology can act as a volume reservoir rather than a surface heat exchanger. Because the thermal reservoir can be operated to provide cold only over a low duty cycle, a large amount of time is available to recharge, and high thermal conductance to the surrounding earth is not required. In examples, the low duty cycle can be in a range 0.5-5%, 0.2-10%, or 0.1-20%.

In a conventional ground energy source operating with capacity C (kW) and a temperature difference of $\Delta T$ (° C.) between an extraction fluid loop and surrounding earth, the surface area A ($m^2$) required is given by $A=C/(k\Delta T)$, where k is the surface heat transfer coefficient between the fluid loop and the surrounding earth (kW/(° C.·$m^2$)). With a duty cycle D (which can be about 0.1-0.2 in examples), the disclosed technology requires a recharge capacity of only C·D for an extraction capacity C. Thus, the reservoir surface area for a disclosed system is only $A=C\cdot D/(k\Delta T)$. With less surface area required, less drilling or digging is required, and a significant saving in capital cost can be achieved, which in turn can lead to rapid uptake of the disclosed technology. In turn, wide-scale deployment can greatly benefit an electricity grid, as described herein.

VIII. Examples Incorporating PCM Devices

Some examples of the disclosed technologies can include PCM devices. Continuing with chart 502, dashed graph 576 and dotted graph 574 indicate temperature profiles of the thermal battery for illustrative examples incorporating PCM within the thermal battery. Graph 574 shows a battery temperature profile with a PCM having critical temperature TB4, with system operation both above and below TB4. At t0, the battery temperature TB3 can be above critical temperature TB4, and the PCM can be in a high-temperature phase such as a liquid phase. As cold is added to the battery, its temperature can drop, following graph 574, until temperature TB4 is reached. Further cold can cause the PCM to release latent heat and undergo phase transition to a low-temperature phase such as a solid phase. As cold is added, an increasing proportion of the PCM can be converted to solid phase. Eventually, all the PCM can be solidified, and further cold causes the battery temperature to fall below TB4. In chart 502, the graph 574 meets graph 572, and the battery temperature can progress along 572, reaching TB1 at t1 and TB2 at t2. As the battery continues to provide cold to a load after t2, its temperature can reach critical temperature TB4 as shown. Subsequently, cold can be provided by absorption of latent heat in the PCM, as the PCM progressively converts from solid to liquid without increasing the battery temperature. The temperature graph 574 branches away from graph 572, maintaining temperature TB4 until all the PCM has converted to its high-temperature phase. After this point, graph 574 climbs upward again, as cold is extracted from the now-liquid PCM and any battery fluid, reaching TB3 at t3. Finally, the battery temperature can hold steady from t3 to t4 as the battery is neither sourcing nor receiving energy.

In the example of graph 574, the battery temperature deviates both above and below the PCM critical temperature; however, this is not a requirement. Graph 576 shows another example in which excursions are only above the PCM critical temperature. In such an example, there can be at least some liquid state PCM over an entire one day cycle, so the battery temperature is clamped to the critical temperature and does not go below the critical temperature. The battery can follow graph 572, with temperature falling from TB0 at to, until the PCM critical temperature TB5 is reached. Here, graph 576 can deviate from graph 572, as addition of cold causes some of the PCM to solidify until time t1, and removal of cold causes the solidified PCM to melt from t1 to t2 and beyond. Because some liquid PCM remains at t1, the graph 576 can remain clamped at TB5. Eventually, further release of cold between t2 and t3 can cause all the PCM to be converted back to liquid, at which point graph 576 meets graph 572, and further temperature evolution can continue along graph 572.

Numerous other PCM designs can be employed. In another example, the system can operate with at least some solid PCM within a battery over the entire course of a day, so that the battery temperature is clamped to the critical temperature and does not rise above the critical temperature. In a further example, sufficient PCM can be used so that the battery temperature stays fixed at the critical temperature over an entire daily cycle, i.e. when cold storage is maximum, some PCM remains in the liquid state, and when cold storage is minimum, some PCM remains in solid state. Moreover, due to seasonal variations and changes in load requirements, the temperature profiles of a given system can evolve from day to day. For example, a given system can have both positive and negative temperature excursions from the PCM critical temperature on a very hot day, but can remain fixed at the PCM critical temperature on a mild day, with other temperature profiles in other conditions.

Similar considerations apply to the thermal reservoir. Although not shown in chart 502, a PCM having a critical temperature in the range (TR0, TR3) can be placed in thermal contact with a thermal reservoir to reduce temperature excursions in the thermal reservoir.

1. PCM Configurations

In some examples, the design of a disclosed system can be optimized for particular target operating temperatures of a thermal battery or thermal reservoir, with gradual decreases in overall system efficiency as system operation deviates from the target temperatures. Because PCM can act as a thermal regulator and reduce overall excursions from the critical temperature, PCM with a suitable critical temperature can effectively control a disclosed system to operate at or close to optimum efficiency across a wide range of environmental, supply, or load conditions. The PCM critical temperature can be selected to be at or close to a temperature at which operation has been optimized (e.g. within 0.5° C., 1° C., or 2° C. of such optimized temperature).

As another variation, a thermal battery can incorporate two or more PCM with distinct critical temperatures. For example, one PCM can be selected for summertime cooling operation, and another PCM can be selected for wintertime heating operation. The two PCM can be provided as distinct PCM devices, or can be mixed within a single PCM device.

2. Dual Tank Apparatus with Two PCM Regulators

Figure 6:
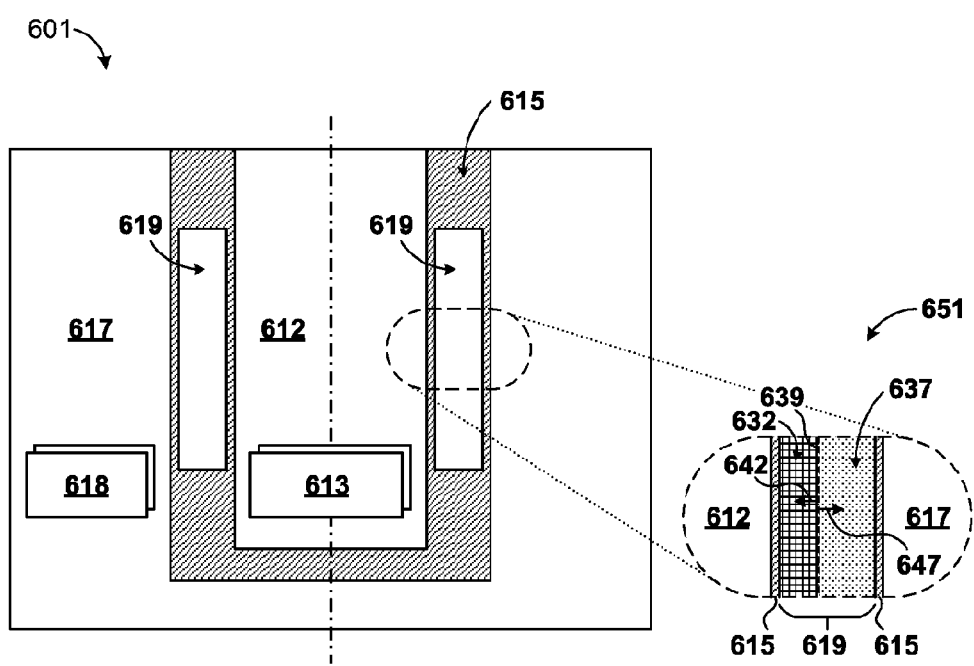
FIG. 6 is a diagram illustrating an example dual tank embodiment of the disclosed technologies, incorporating two phase change material (PCM) devices.

FIG. 6 is a diagram illustrating an example dual tank apparatus 601 incorporating multiple phase change material (PCM) devices. Tank 612 can be surrounded by tank 617. The fluid volumes of tanks 612, 617 can be separated by a structure 615.

Within tank 612, one or more thermal regulators 613 can incorporate a first PCM having a first critical temperature. The first critical temperature can be selected to match a designed operating temperature of the tank 612, or can be selected to be within an operating temperature range of the tank 612. Tank 612 can be designed to operate as a thermal battery as described herein.

One or more thermal regulators 618 or 619 can be positioned in thermal contact with a medium occupying tank 617. Thermal regulators 618, 619 can incorporate PCM with respective second or third critical temperatures, which can be distinct from the first critical temperature of regulator 613. In varying examples, apparatus 601 can incorporate a thermal regulator 618 or a thermal regulator 619.

As shown, thermal regulator 618 can be positioned wholly within a fluid volume of tank 617. The second critical temperature of regulator 618 can be selected to match a designed operating temperature of the tank 617, or can be selected to be within an operating temperature range of the tank 617. Tank 617 can be designed to operate as a thermal reservoir as described herein.

3. PCM Device Between Tanks

In varying examples, structure 615 can be a single-layer panel; a multi-layer laminate; a more complex structure such as a sheathed honeycomb lattice or another sheathed grid; or any combination of such structural units. Any of these structural configurations can be dubbed a "wall." Wall 615 can be constructed of a structural plastic, such as polyvinyl chloride (PVC) or another thermoplastic; a composite, including fiber-reinforced composites; or a metal, such as steel; in any combination. Accordingly, some structures 615 can include or can be integrated with a PCM device such as 619.

According to design, the third critical temperature of regulator 619 can be selected, for cooling mode operation, in a range from a minimum design operating temperature of tank 612 to a maximum design operating temperature of tank 617. The third critical temperature and a design operating temperature of tank 612 can be selected to match, so that regulator 619 provides thermal regulation of tank 612. The third critical temperature and a design operating temperature of tank 617 can be selected to match, so that regulator 619 provides thermal regulation of tank 617. The third critical temperature can be between respective design operating temperatures of tanks 612, 617, so that PCM device 619 provides an energy storage buffer accessible to both tanks 612, 617. Particularly, as indicated in inset 651, a phase boundary 639 within regulator 619 can move according to modes of operation of a disclosed system. Boundary 639 can separate e.g. a solid phase of PCM 632 on the side of colder tank 612 from e.g. a liquid phase of PCM 637 on the side of less cold tank 617. For example, when regulator 619 receives more cold from tank 612 than it provides to tank 617, the phase boundary can shift toward the fluid volume of tank 617, as indicated by arrow 647. When regulator 619 provides more cold to tank 617 than it receives from tank 612, the phase boundary can shift closer to the fluid volume of tank 612, as indicated by arrow 642.

The apparatus 601 can be configured for installation at a median depth D at a site having a mean underground temperature TS within a target range [TS_low, TS_high]. TS_high is greater than or equal to TS, and is the lower limit of the target temperature TR of the thermal reservoir when the heat pump runs in cooling mode. TS_low is less than or equal to TS, and is the upper limit of the target temperature TR of the thermal reservoir when the heat pump runs in heating mode. In turn, the thermal reservoir can have a design operating temperature range [TR_low, TR_high] over a day or over a season. In cooling mode, TS_high≤TR_low to provide flow of cold energy from underground soil to the reservoir, while in heating mode, TR_high≤TS_low. In some examples, the critical temperature T17 of the PCM devices 618, 619 can be selected within the design operating temperature range of the reservoir, i.e. TR_low≤T17≤TR_high.

Meanwhile, the first critical temperature T13 of the PCM device 613 can be lower than the mean underground temperature TS for cooling mode, and can be higher than the mean underground temperature TS for heating mode. Overall, for cooling mode operation, the apparatus 600 can be designed such that T13<TS_low<TS_high≤TR_low ≤T17≤TR_high. Conversely, for heating mode operation, where the thermal battery can be operated at a temperature above TS and the critical temperatures can satisfy T13>TS_high>TS_low>TR_high≥T17≥TR_low.

4. PCM Regulators Supporting Cooling and Heating Operating Modes

In further examples, any one or more among regulators 613, 618, 619 can incorporate two phase change materials selected for heating and cooling modes of operation respectively. That is, a first PCM can support operation where a tank 612, 617 receives, stores, or provides cold energy for cooling a load, and a second PCM can support operation where a tank 612, 617 receives, stores, or delivers heat energy for heating a load. As an illustration, a thermal battery 612 can operate over a temperature range 2-13° C. in cooling mode, and over a temperature range 32-54° C. in heating mode. Two PCMs with critical temperatures 2° C. and 54° C. (or, 5° C. and 50° C., or other similar pairs of temperatures) can be incorporated as regulators within the tank 612.

A single physical housing can incorporate two or more thermal regulators with respective PCMs or respective critical temperatures. A single thermal regulator can be distributed among two or more physical packages. For example, a single thermal regulator can be implemented as multiple sealed PCM packs, e.g. from 1-10, 10-100, 100-1000, or even more discrete PCM packs.

IX. Example Cooling Modes

FIGS. 7A-7D are schematic diagrams 701-704 of the system of FIG. 4 as configured for exemplary cooling modes of operation. Dotted lines are used to mark inactive fluid pathways or loops in the illustrated system.

Figure 7A:
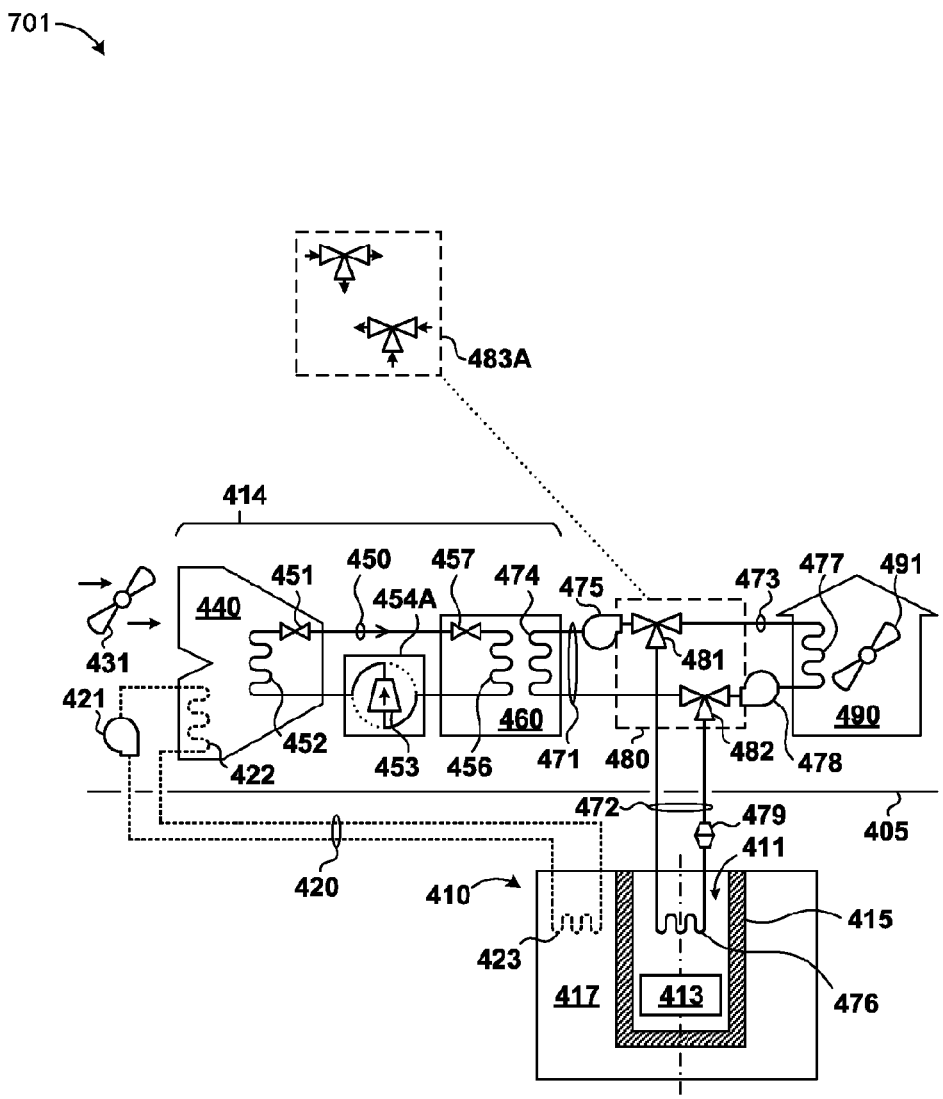
FIGS. 7A-7D are schematic diagrams of the system of FIG. 4 configured for exemplary cooling modes of operation.

In FIG. 7A, as for all cooling examples described, four-way valve configuration 454A can be used to provide clockwise fluid flow in loop 450. Condenser 440 is configured for air intake, and valve assembly 480 is in configuration 483A, so that cold can be provided by heat pump 414 to both building 490 and battery 411. This operating mode can be an example of mode 1A described in context of FIG. 2.

Figure 7B:
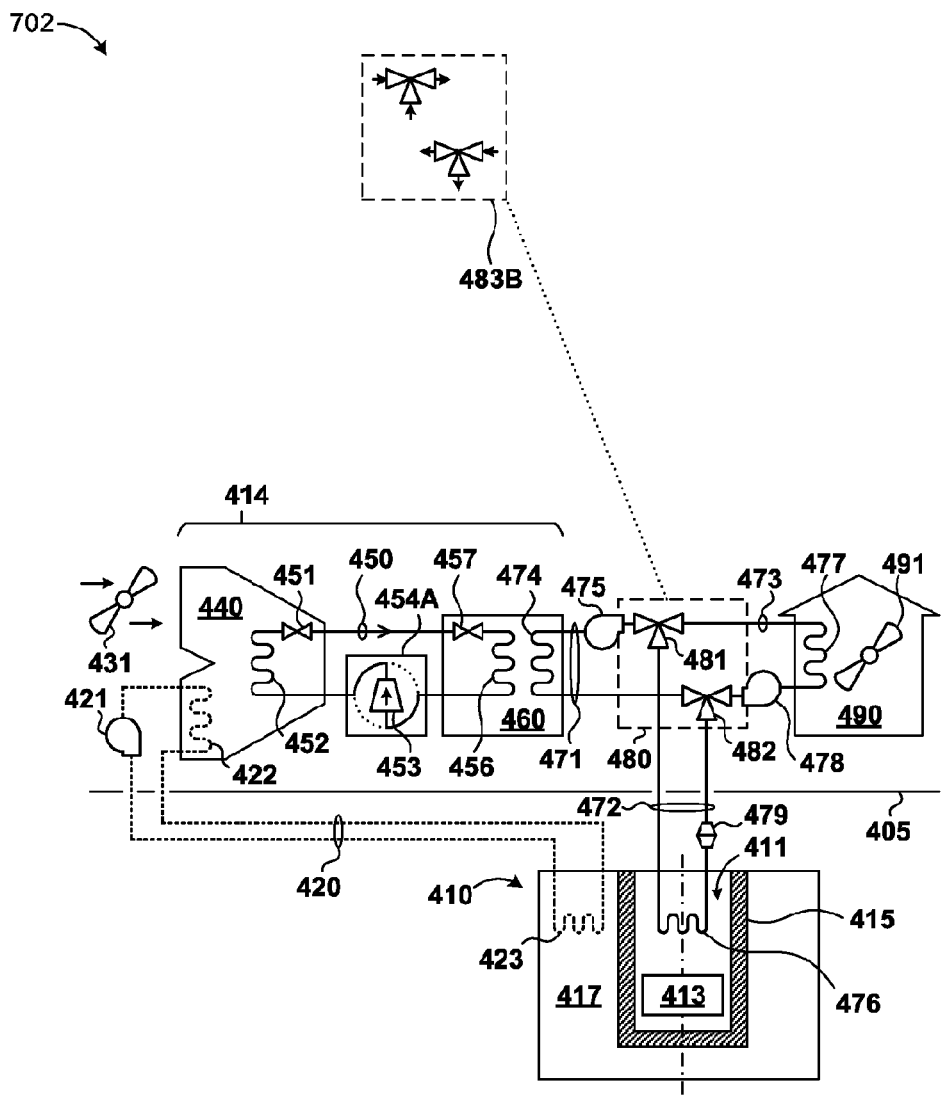

In FIG. 7B, condenser 440 is configured for air intake, and valve assembly 480 is in configuration 483B, so that both heat pump 414 and battery 411 both provide cold to building 490. This operating mode can be an example of mode 2A described in context of FIG. 2.

Figure 7C:
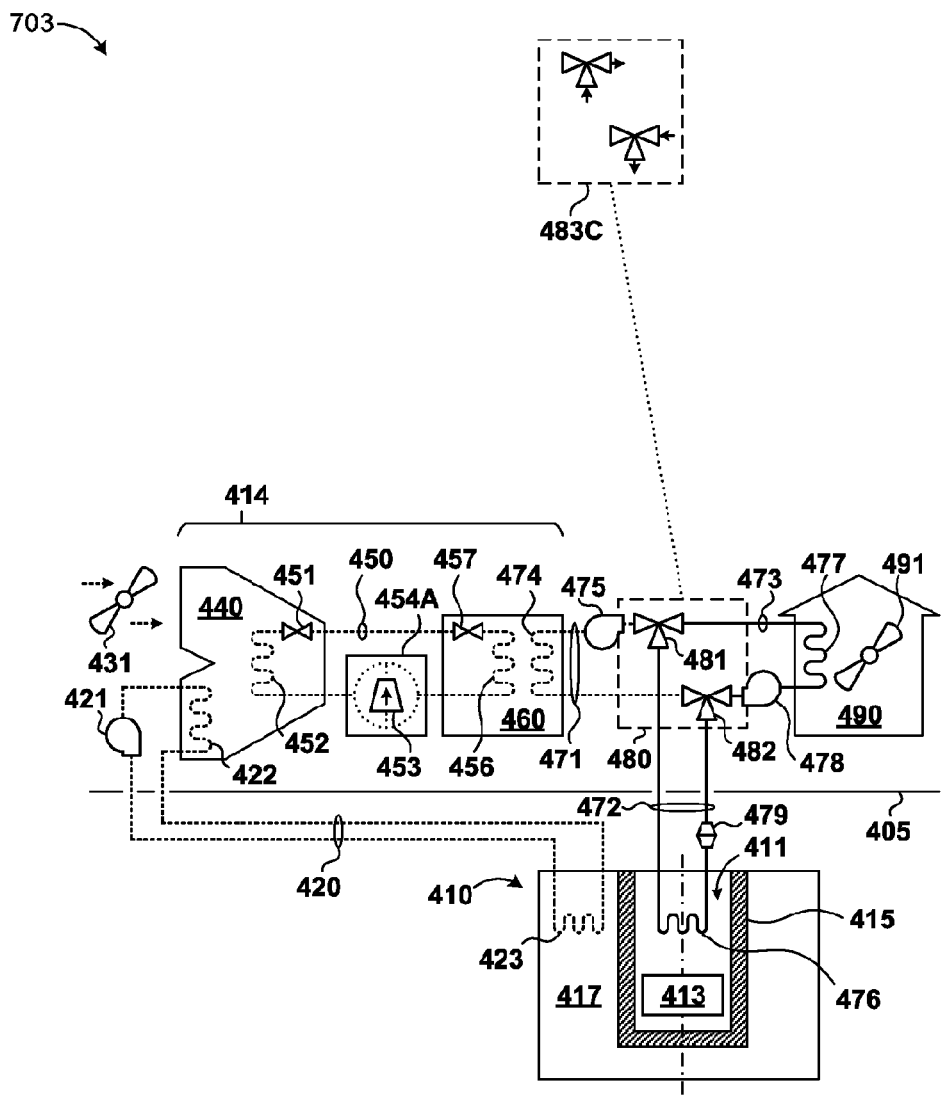

In FIG. 7C, fluid loops 420, 450, and pathway 471 are inactive, and cold can be transferred directly from thermal battery 411 to building 490 via pathways 472, 473, bypassing heat pump 414. This operating mode can be an example of mode 2C described in context of FIG. 2.

Figure 7D:
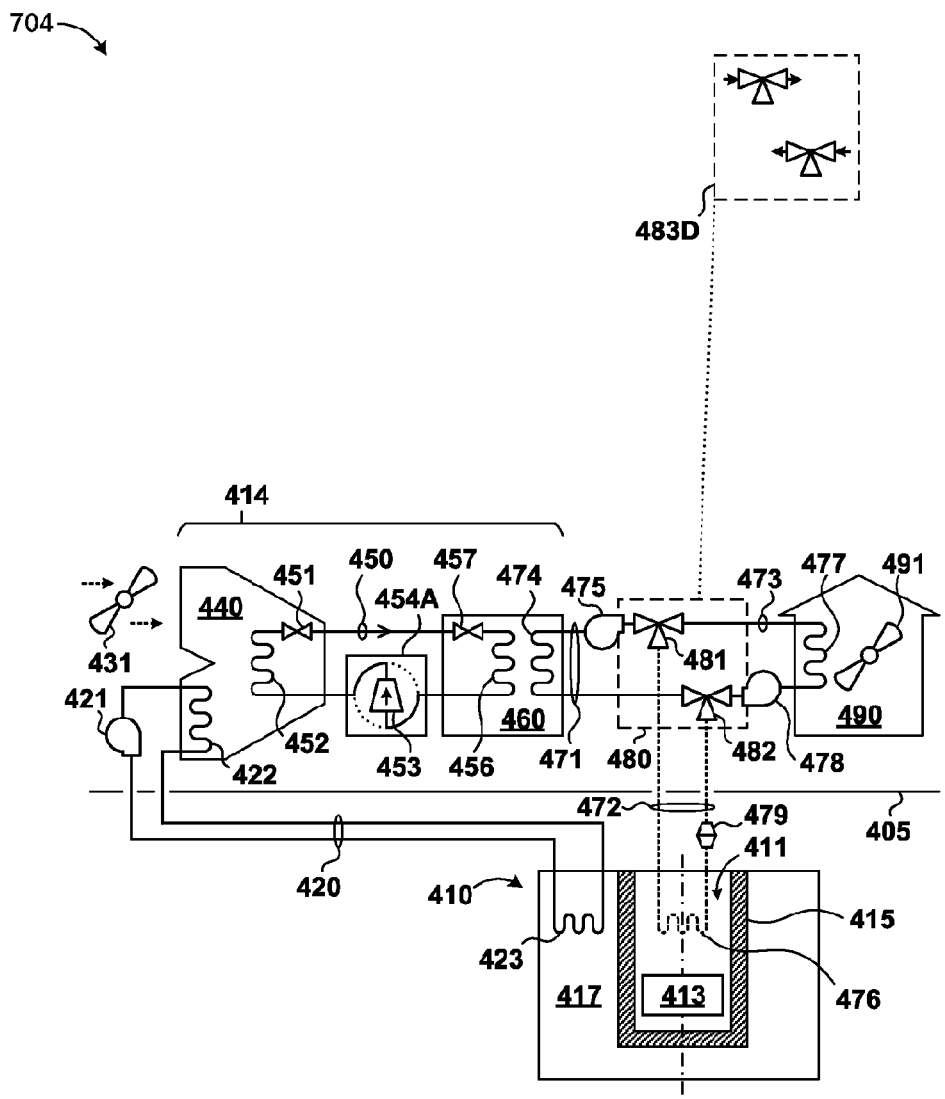

In FIG. 7D, fluid pathway 472 and fan 431 are inactive, and heat pump 414 can source cold from reservoir 417, and can provide energy to building 490 via pathways 471, 473. This operating mode can be an example of mode 3 described in context of FIG. 2.

X. An Example Cold Recharge Configuration

Figure 8:
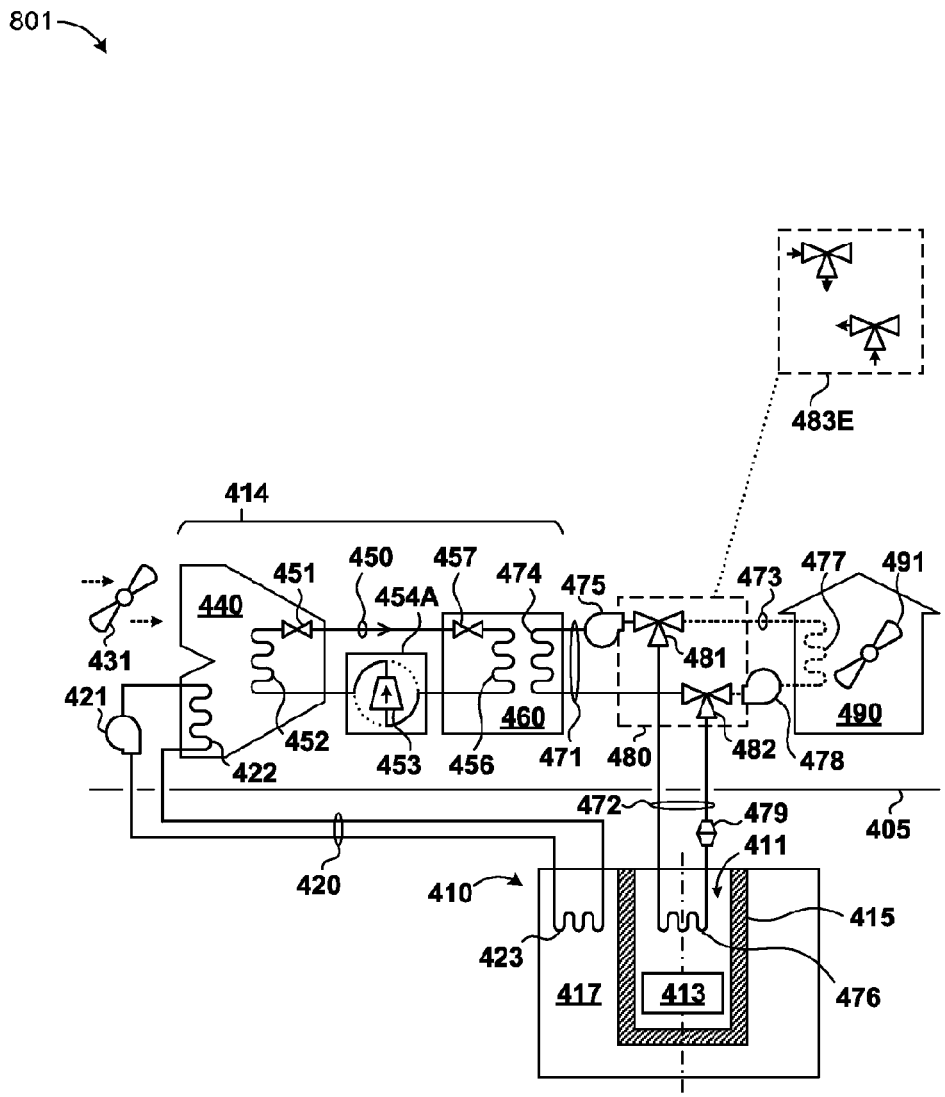
FIG. 8 is a schematic diagram of the system of FIG. 4 configured for an exemplary cold recharge mode of operation.

FIG. 8 is a schematic diagram 801 of the system of FIG. 4 configured for an exemplary cold recharge mode of operation. In FIG. 8, fluid pathway 473 and fan 431 are inactive, and heat pump 414 can source cold from reservoir 417, and can provide cold to recharge battery 411 via pathways 471, 472. In examples, the cold provided to battery 411 can be at a lower temperature than the cold extracted from reservoir 417. In further examples, the quantity of cold provided to battery 411 can be smaller than the quantity of cold extracted from reservoir 417.

In some examples, cooling can be provided to building 490 with a duty cycle of less than 100%, and the operating mode of FIG. 8 can be interleaved with other operating modes in which cold is delivered to the building 490. The operating mode of FIG. 8 can have greater efficiency than other methods or operating modes for recharging the battery 411.

XI. A First Example Control Procedure

Figure 9:
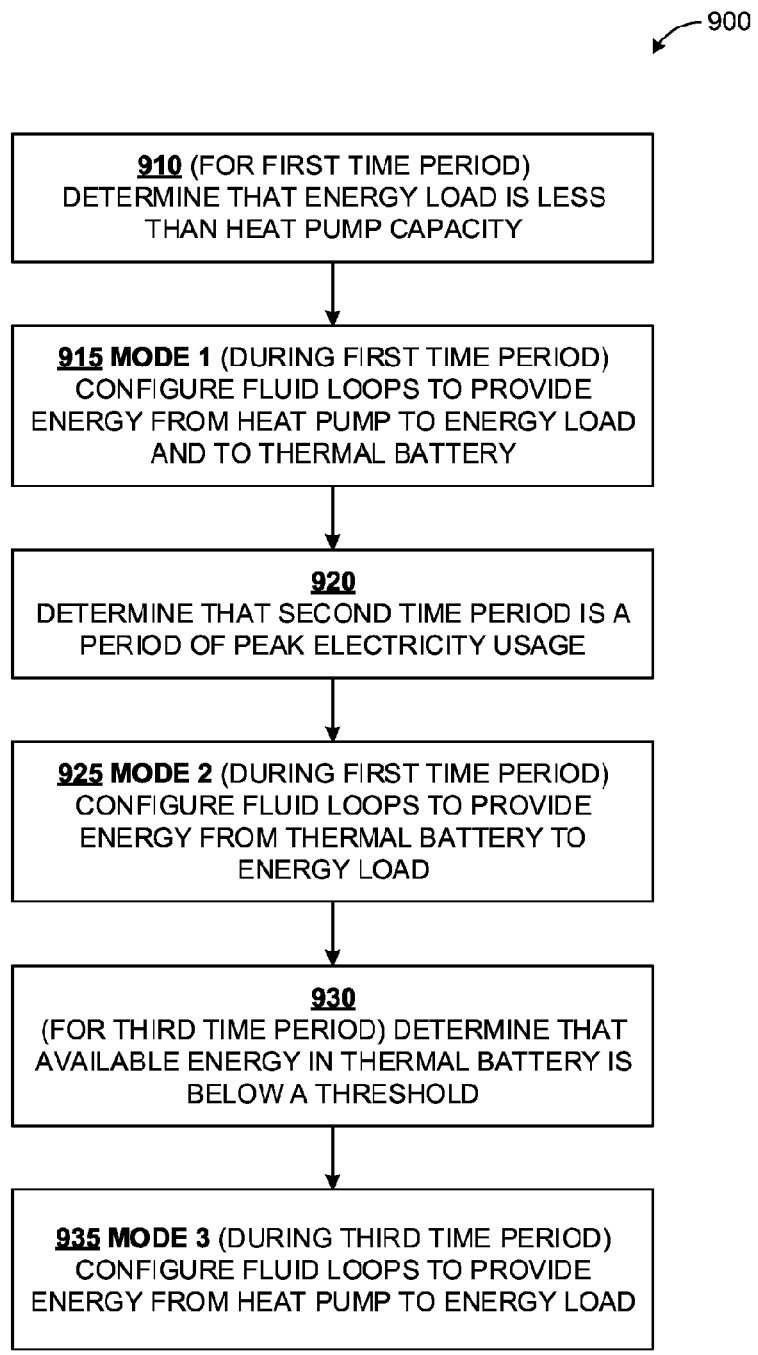
FIG. 9 is a flowchart illustrating a first control procedure for the disclosed technologies.

FIG. 9 is a flowchart 900 illustrating a first control procedure for a disclosed system. Process blocks 910, 920, 930 provide decisions for entering first, second, or third modes of operation, and process blocks 915, 925, 935 configure a disclosed system to operate in the respective mode.

The disclosed system can include a heat pump and a thermal battery, with one or more fluid loops operable to provide energy transfer among the heat pump, the thermal battery, and an energy load such as a building. Although not required for the basic operation of the illustrated control procedure, further example systems can include a thermal reservoir coupled to an input of the heat pump and operable to provide energy to an input of the heat pump. The thermal reservoir can be passively cooled from the thermal battery and, for underground installations, can also be cooled from surrounding earth. Either the thermal battery or, if present, the thermal reservoir can incorporate or can be thermally coupled to one or more thermal regulators as disclosed herein.

At process block 910, a determination can be made that an energy load is less than a capacity of a heat pump for a first time period. In some examples, the energy load can be a heating or cooling energy demand from a building. At process block 915, responsive to this determination, one or more fluid loops can be configured to provide energy from the heat pump to the energy load and to a thermal battery during the first time period. The system configuration implemented at process block 915 can be similar to Mode 1 described herein, including modes 1A or 1B. In varying examples, these energy transfers can be provided using a fluid loop with multiple pathways similar to 471-473 of FIG. 4, or with distinct fluid loops; these energy transfers can be provided simultaneously or in alternating fashion.

At process block 920, a determination can be made that a second time period is a period of peak electricity usage. At process block 925, responsive to this determination, the one or more fluid loops can be configured to provide energy from the thermal battery to the energy load during the second time period. The system configuration implemented at process block 925 can be similar to Mode 2 described herein, including modes 2A, 2B, or 2C.

At process block 930, a determination can be made that available energy in the thermal battery is below a threshold for a third time period. At process block 935, responsive to this determination, the one or more fluid loops can be configured to provide energy from the heat pump to the energy load during the third time period. The system configuration implemented at process block 915 can be similar to Mode 3 described herein.

Numerous variations can be implemented. In some examples, the first, second, and third time periods can be distinct non-overlapping periods during one 24-hour day. During this day the energy load can be a cooling load, and the operations of FIG. 9 can be repeated on another day when the energy load is a heating load. In some examples, the determinations of process blocks 910, 930 can be made during predetermined first and third time periods. In other examples, the first and third time periods can commence responsive to the determinations of process blocks 910, 930.

In further examples, modes of operation can be controlled based on a relationship between ambient air temperature and a threshold temperature. For example, in a cooling application, when air temperature is below the threshold, the heat pump can be run off ambient air input (i.e. receiving input energy from ambient air), which can be more efficient than running off an underground thermal reservoir, or can avoid depleting energy stored in the thermal reservoir. Conversely, when the air temperature is above the threshold, the heat pump can be run off the thermal reservoir for greater efficiency than running off ambient air. Operation in a heating application can be similar: running the heat pump off ambient air when the ambient air temperature exceeds a threshold, and off a thermal reservoir when the ambient air temperature is below the threshold. In some examples, the threshold can be a temperature of the thermal reservoir monitored during operation; a mean temperature of the thermal reservoir or surrounding earth over a time period such as a day, a season, or one or more years; or any of these temperatures with a predetermined offset added or subtracted. The offset can favor running the heat pump off air when the efficiency penalty of air operation is small, so as to avoid depletion of the thermal reservoir.

In additional examples, the method can include making a determination, during the first time period, that the energy charging state (dubbed "charge state") of the thermal battery is above a threshold. To illustrate, the threshold can correspond to a percentage of a rated energy storage capacity of the thermal battery relative to a baseline temperature or baseline state. The percentage can be e.g. 100%, or between 90% and 100%. The baseline temperature can be a predetermined temperature such as a minimum, median, or mean design operating temperature of the thermal battery. Responsive to the determination, the one or more fluid loops can be reconfigured to disable energy transfer to the thermal battery for a subsequent portion of the first time period, including for the remainder of the first time period.

In further examples, process block 925 can include configuring the heat pump to be off, to reduce electricity usage of the disclosed system. Process block 935 can include configuring the one or more fluid loops to disable energy transfer to or from the thermal battery during the third time period.

The method can also include making a determination, during the second time period, that a charge state of the thermal battery is below a threshold. This threshold can be an indication that the thermal battery is spent. In a cooling application, a thermal battery having temperature above about 13° C. (or above a threshold in a range 10-15° C.) can be ineffective for providing cooling to a building. Conversely, in a heating application, a thermal battery having temperature below about 27° C. (or below a threshold in a range 25-30° C.) can be ineffective for providing heating. Responsive to this determination, the one or more fluid loops can be reconfigured to disable energy transfer from the thermal battery to the energy load and to enable energy transfer from the heat pump to the energy load, for a subsequent portion of the second time period, including the remainder of the second time period.

In some examples, a temperature of the thermal battery can be monitored to provide an indicator of its charge state. In other examples, a thermal battery can utilize PCM regulation. In a cooling application with PCM regulation, a temperature above the PCM critical temperature can indicate 0% charge state, and a temperature below the PCM critical temperature can indicate 100% charge state. A similar technique can be applied in a heating application. For intermediate charge states, metering heat transfer in or out of the thermal battery can provide an estimate of the charge state of the PCM regulator, relative to the total energy storage capacity of the thermal battery.

XII. A Second Example Control Procedure

Figure 10:
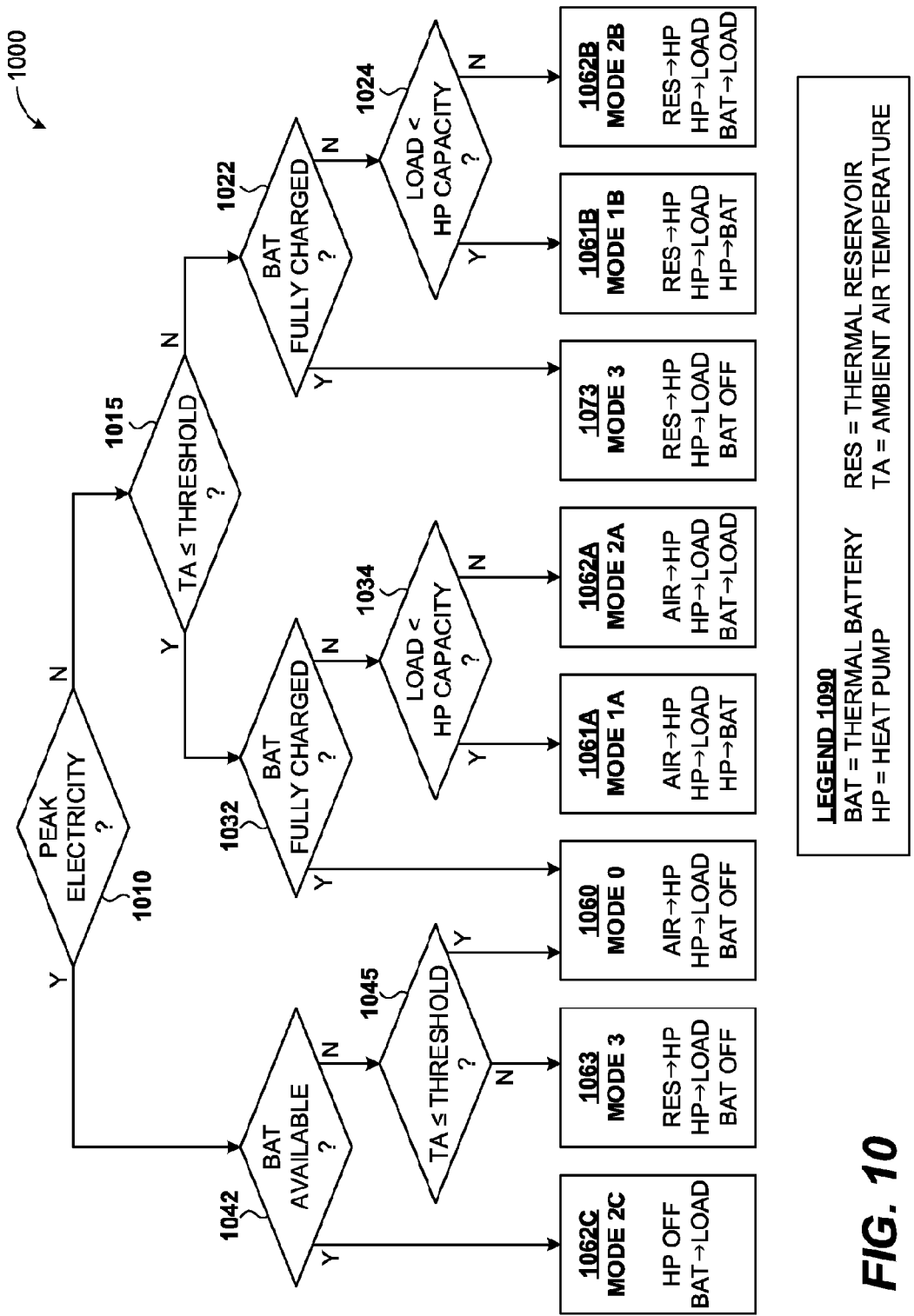
FIG. 10 is a flowchart illustrating a second control procedure for a cooling application of the disclosed technologies.

FIG. 10 is a flowchart 1000 illustrating an example control procedure for a cooling application of the disclosed technologies. This control procedure can follow the illustrated decision flowchart 1000 to make a determination of a suitable mode into which a disclosed system can be placed. The control procedure of FIG. 10 can be evaluated at predetermined times, periodically, or continuously. The flowchart makes use of certain abbreviations as indicated at legend 1090, such as "BAT" for a thermal battery, "HP" for a heat pump, "RES" for a thermal reservoir, and "TA" for an ambient air temperature.

At decision block 1010, the control procedure branches according to whether an instant time is during a period of peak electricity usage, such as during the late afternoon. If the instant time is during a peak electricity use period, the procedure follows the Y branch from block 1010 to decision block 1042, where a determination can be made whether an instant thermal battery has available stored energy. Such a determination can be made by comparing the battery temperature with a threshold temperature, or by measuring a charge state of a thermal regulator within or in contact with the thermal battery. If the battery has available energy, the Y branch from block 1042 is followed to block 1062C, indicating that the instant disclosed system can be put into mode 2C as described herein, with heat pump off to save electricity, and the battery delivering energy to the load. Returning to block 1042, if the battery is depleted, then the procedure follows the N branch from block 1042 to decision block 1045. If the ambient air is below a threshold, it can be advantageous to cool using ambient air, and the procedure follows the Y branch from block 1045 to block 1060 for mode 0. The disclosed system can be put into mode 0, with ambient air providing energy to the heat pump, and the heat pump delivering energy to the load, with the thermal battery inactive (i.e. no energy transferred to or from the thermal battery). However, if the ambient air is above the threshold, the procedure can follow the N branch from block 1045 to block 1063 for mode 3. The disclosed system can be placed in mode 3, with a thermal reservoir providing energy to the heat pump, and the heat pump delivering energy to the load, with the thermal battery inactive.

Returning to block 1010, the N branch is followed to decision block 1015 during a non-peak electricity usage period. If the ambient temperature is above the threshold, it can be advantageous to run the heat pump off the thermal reservoir. The N branch is followed from block 1015 to decision block 1022, where a determination of the battery charge state can be made. If the thermal battery is fully charged (or, has a charge state exceeding a threshold), then the Y branch is followed from block 1022 to block 1073 for mode 3, and the disclosed system can be operated as for block 1063. If the battery is not fully charged, the N branch from block 1022 leads to block 1024, where the instant energy load can be compared with the instant capacity of the heat pump. If the load is less than the heat pump capacity, then the heat pump has excess capacity which can be used to charge the thermal battery. The Y branch from block 1024 leads to block 1061B. The disclosed system can be operated in mode 1B, with the heat pump running off the thermal reservoir, and providing energy to both the load and the thermal battery. However, if the energy load is greater than the heat pump capacity, then the N branch from block 1024 leads to block 1062B. The disclosed system can be operated in mode 2B, with the heat pump running off the thermal reservoir, and both the heat pump and the thermal battery together providing energy to the load.

Returning to block 1015, if the ambient temperature is below the threshold, it can be advantageous to operate the heat pump off ambient air. Decision blocks 1032, 1034 are substantially similar to blocks 1022, 1024 previously described, however the heat pump capacity used at block 1034, running off ambient air, can be different from the heat capacity used at block 1024, which corresponds to running the heat pump off the thermal reservoir. Decision blocks 1032, 1034 lead to blocks 1060 (mode 0), 1061A (mode 1A), or 1062A (mode 2A), which are similar to blocks 1073, 1061B, 1062B respectively, except for running the heat pump off air instead of off the thermal reservoir.

The flowchart 1000 is merely illustrative. In varying examples, more or less decision blocks can be used, or the decision blocks can be organized differently. Additional states (e.g. an idle state) can be introduced. The control procedure can be adjusted to account for predicted energy loads or weather conditions in subsequent time periods. Additional monitoring can be employed to detect other charge states of the thermal reservoir or the thermal battery, besides empty (N branch from illustrated decision block 1042) and full (decision blocks 1022, 1032). For example, some battery capacity can be held in reserve for an upcoming period of anticipated high energy demand, or the battery charging can be turned off at less than full charge if reduced energy demand is predicted for coming time periods or days.

XIII. An Example Daily Cycle for Heating

Figure 11:
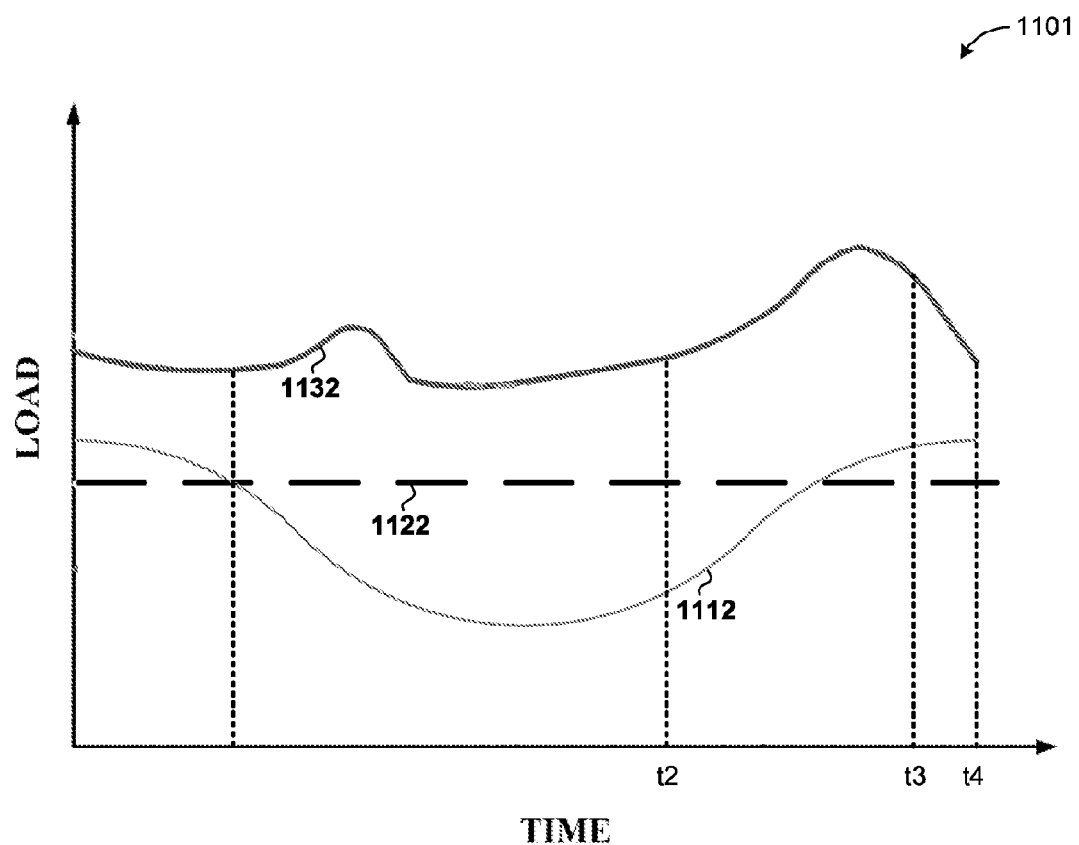
FIG. 11 is a chart illustrating an example daily cycle in a heating application of the disclosed technologies.

FIG. 11 is a chart 1101 illustrating an example daily cycle in a heating application of the disclosed technologies. Graph 1112 illustrates variation in heat demand over a 24-hour day, with heating demand peaking at night and lowest around mid-day. Similar to graph 522, graph 1122 represents energy capacity available from a heat pump, for a simple illustrative case of uniform source and load temperatures. Similar to graph 532, graph 1132 shows total electricity usage for the building using conventional heating technology, with an air source heat pump, an electric resistance heater, an natural gas furnace, or other conventional space heating systems.

Starting with interval (t1, t2), as the sun rises in the morning, air warms up, or optional solar powered heat becomes available, demand for heat from a disclosed system drops. A heat pump can meet this demand with leftover capacity which can be used to store energy in a thermal battery. To illustrate, t1 can be about 9 am and t2 can be about 3 pm, although there can be considerable variation. The mode of operation in this interval can be similar to Mode 1 described in context of FIG. 2.

During interval (t2, t3) electricity usage is high, and it can be advantageous to turn the heat pump off, leaving the thermal battery to provide heat to a load building on its own, similar to Mode 2C described in context of FIG. 2. Subsequently, as electricity usage drops and battery storage is diminished, the heat pump can be turned on again at time t3, and the heat pump can draw on a thermal reservoir to provide energy to the load building from t3 to t4, and continuing from t0 to t1.

This operation can be similar to Mode 2B or Mode 3 described in context of FIG. 2. To illustrate, t3 can be about 8 pm, while t0 and t4 can be about midnight one day apart, with variations.

Numerous variations can be employed. In the interval (t1, t2), the heat pump can switch between using ambient air or the thermal reservoir as a source, based on the air temperature or the available stored energy, similar to modes 1A, 1B described in context of FIG. 2. For another portion of interval (t1, t2) the heat pump can be limited solely to supplying a load building with energy (similar to Mode 3 of FIG. 2), so as to restrict recharging of the thermal battery to periods when the heat pump can operate at high efficiency or when electricity cost is low.

Thus, a heating application can use similar modes of operation as a cooling application, with possible differences in an order in which modes are executed, or the times of day suitable for each mode.

XIV. Example Heating Modes

FIGS. 12A-12D are schematic diagrams 1201-1204 of the system of FIG. 4 as configured for exemplary heating modes of operation. Dotted lines are used to mark inactive fluid pathways or loops in the illustrated system. The diagrams are generally similar to the cooling modes of FIGS. 7A-7D, however four-way valve configuration 454B can be used to provide counterclockwise fluid flow in loop 450.

Figure 12A:
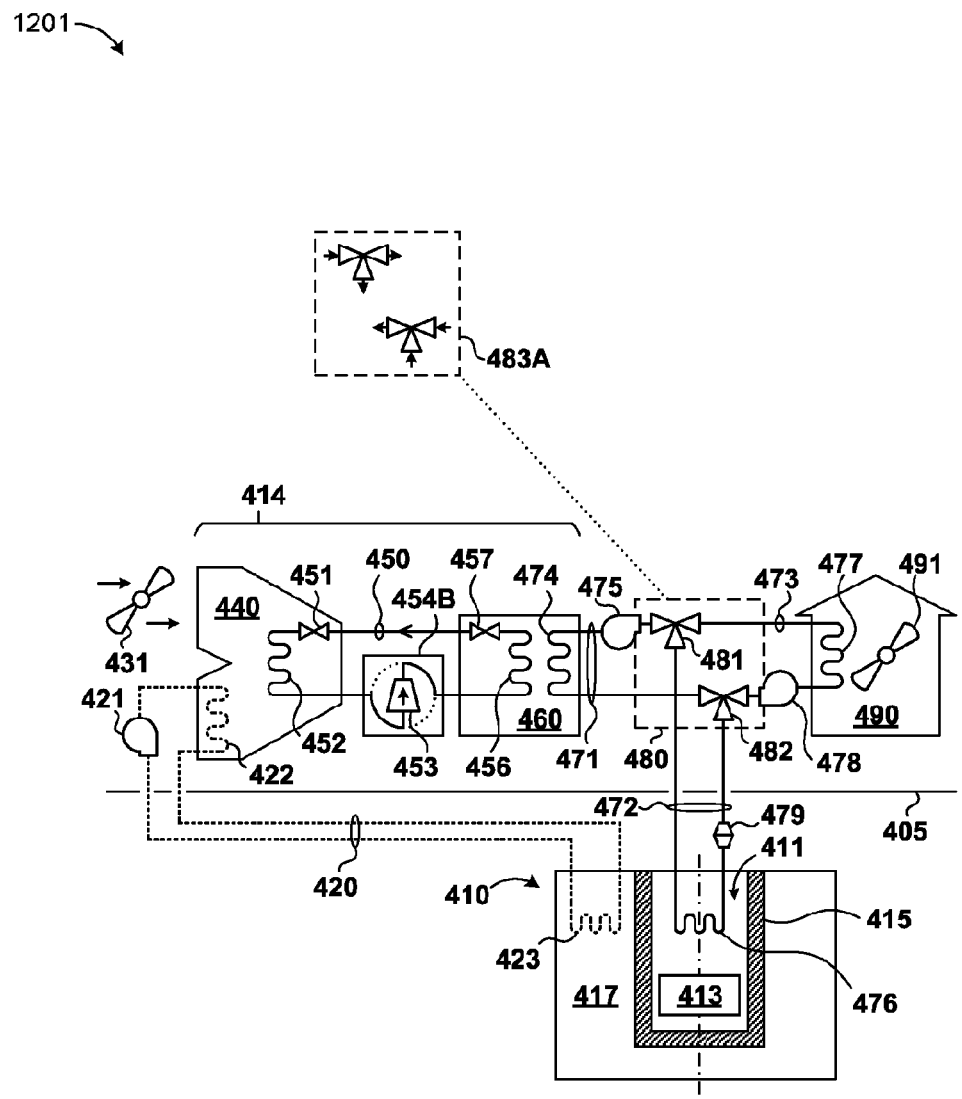
FIGS. 12A-12D are schematic diagrams of the system of FIG. 4 configured for exemplary heating modes of operation.

In FIG. 12A, evaporator 440 is configured for air intake, and valve assembly 480 is in configuration 483A, so that heat can be provided by heat pump 414 to both building 490 and battery 411. This operating mode can be an example of mode 1A described in context of FIG. 2.

Figure 12B:
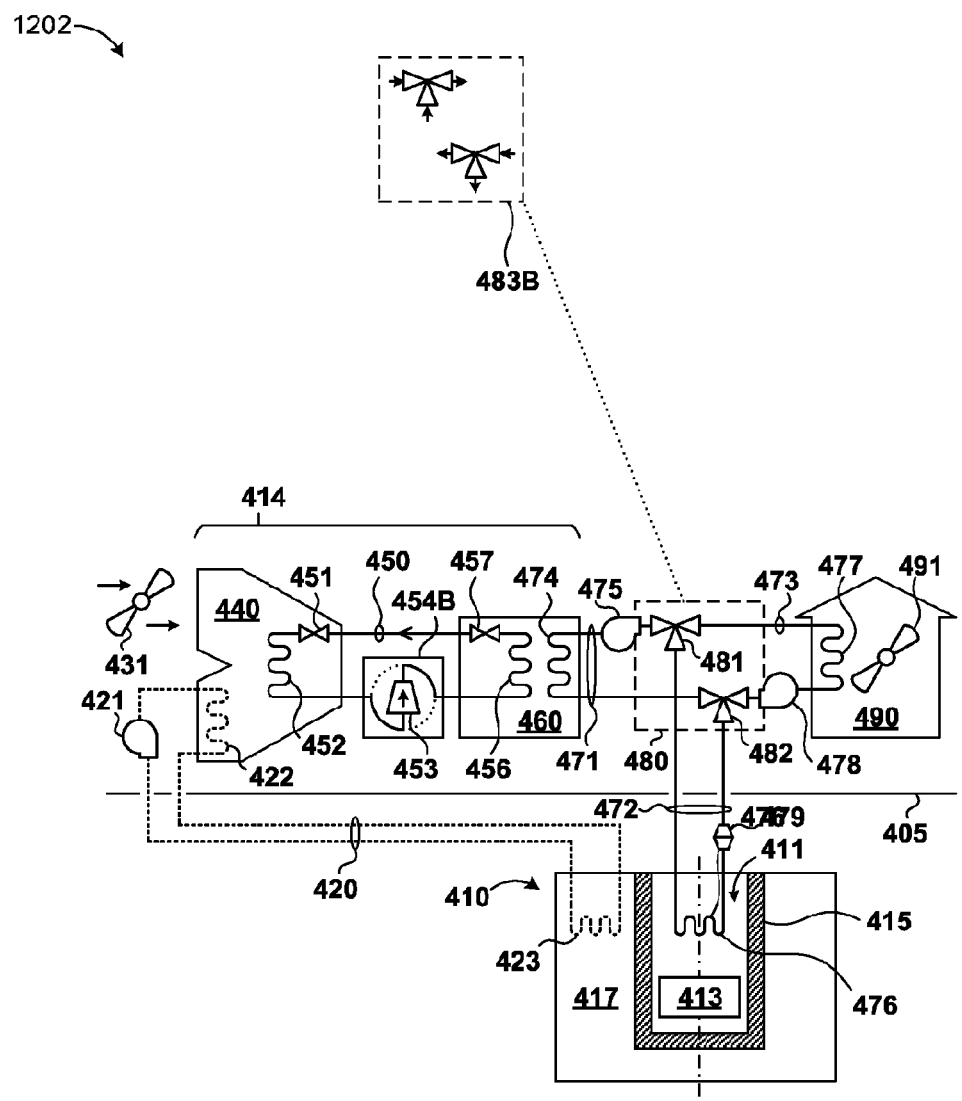

In FIG. 12B, evaporator 440 is configured for air intake, and valve assembly 480 is in configuration 483B, so that both heat pump 414 and battery 411 provide heat to building 490. This operating mode can be an example of mode 2A described in context of FIG. 2.

Figure 12C:
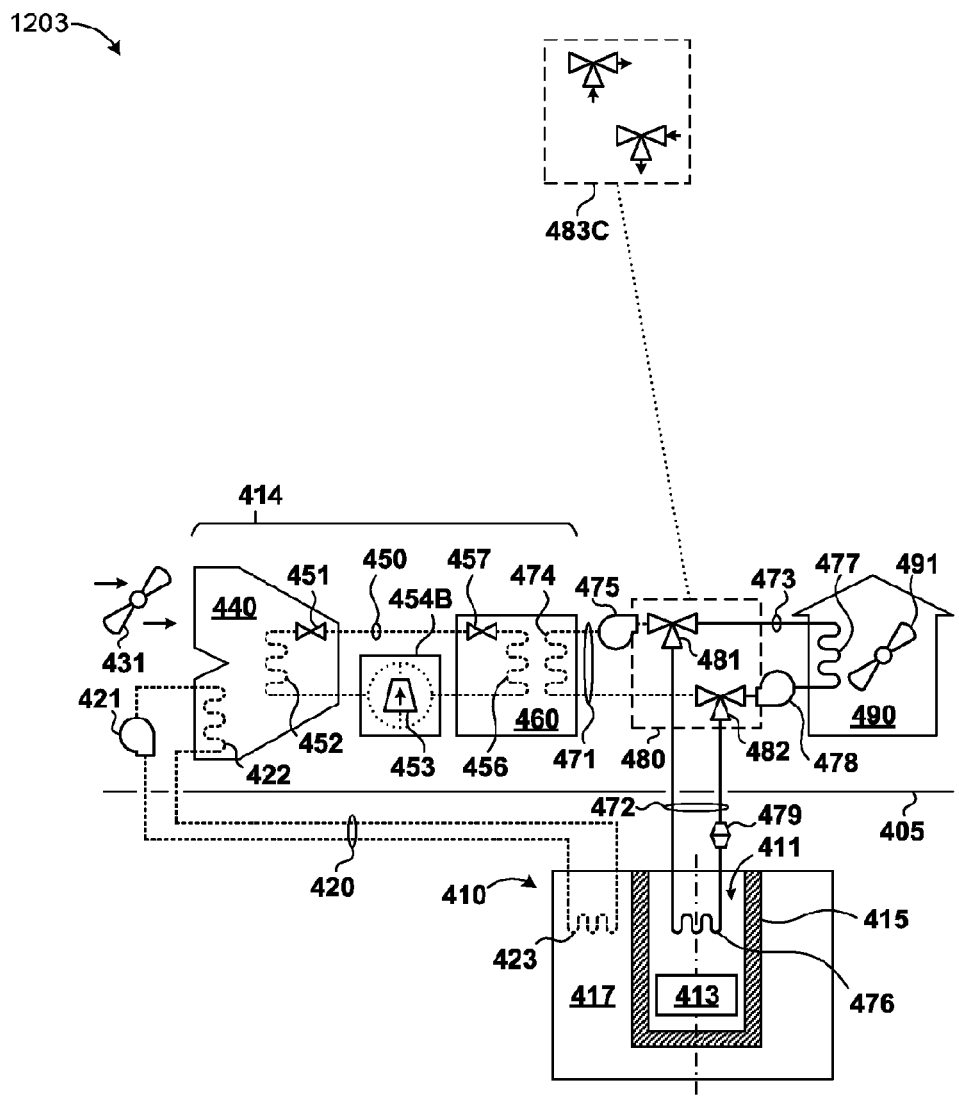

In FIG. 12C, fluid loops 420, 450, and pathway 471 are inactive, and heat can be transferred directly from thermal battery 411 to building 490 via pathways 472, 473. This operating mode can be an example of mode 2C described in context of FIG. 2.

Figure 12D:
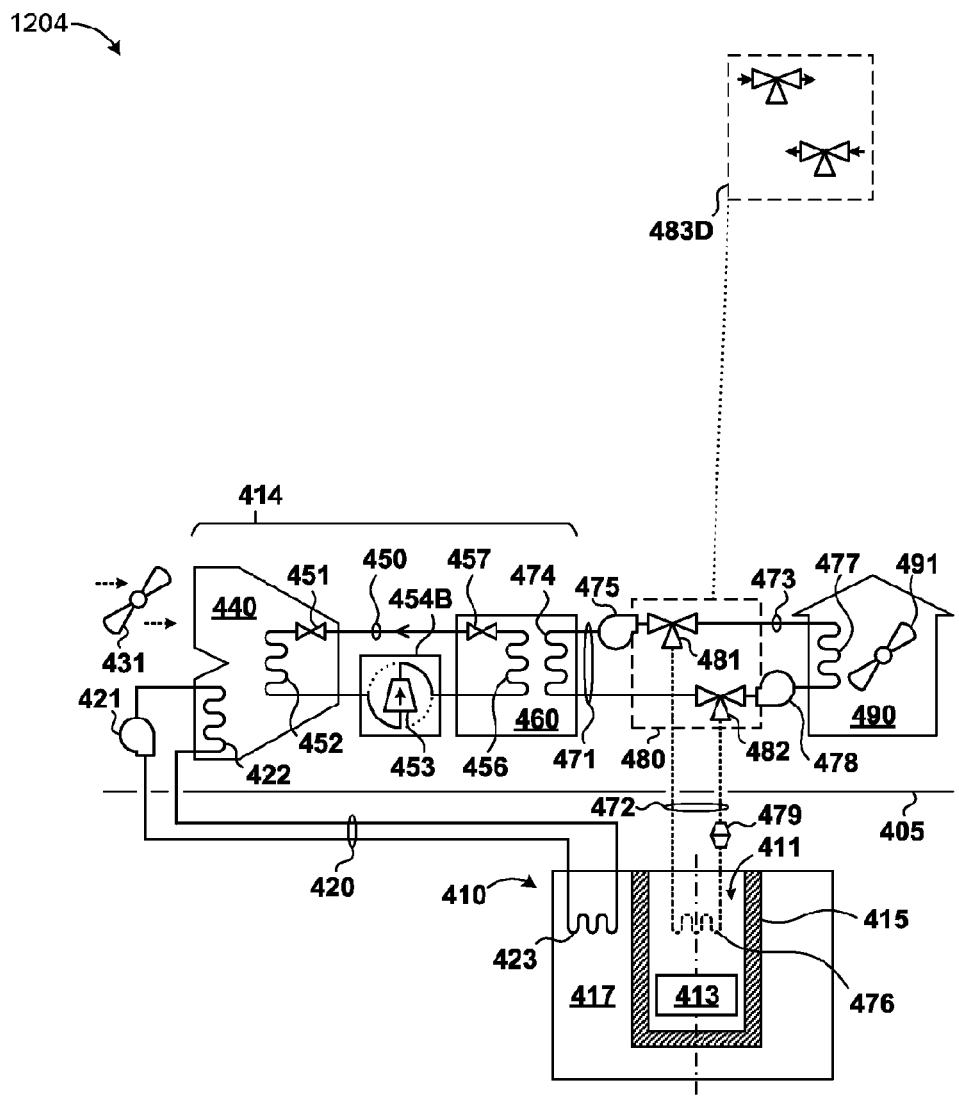

In FIG. 12D, fluid pathway 472 and fan 431 are inactive, and heat pump 414 can source heat from reservoir 417, and can provide energy to building 490 via pathways 471, 473. This operating mode can be an example of mode 3 described in context of FIG. 2.

XV. An Example Heat Recharge Configuration

Figure 13:
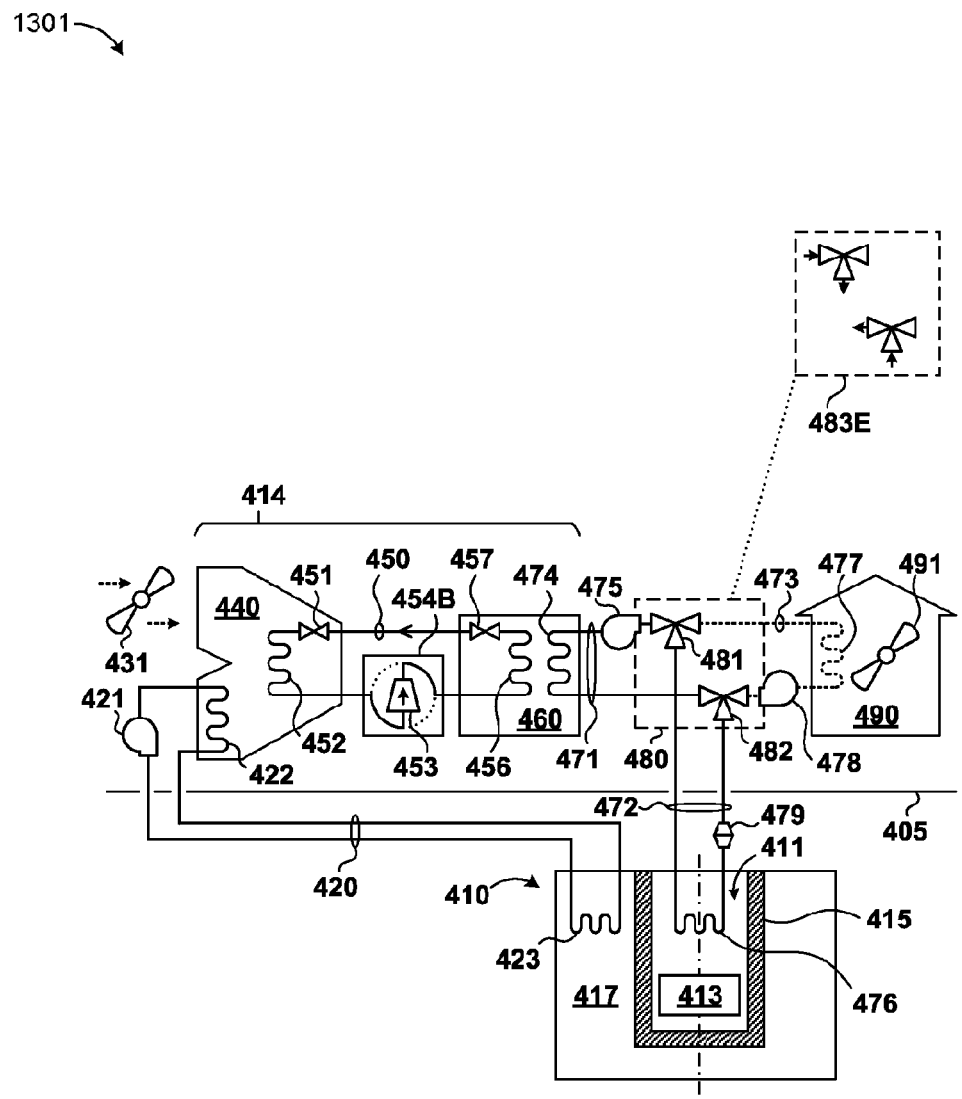
FIG. 13 is a schematic diagram of the system of FIG. 4 configured for an exemplary heat recharge mode of operation.

FIG. 13 is a schematic diagram 1301 of the system of FIG. 4 configured for an exemplary heat recharge mode of operation. In FIG. 13, fluid pathway 473 and fan 431 are inactive, and heat pump 414 can source heat from reservoir 417, and can provide heat to recharge battery 411 via pathways 471, 472. In examples, the heat provided to battery 411 can be at a higher temperature than the heat extracted from reservoir 417. In further examples, the quantity of heat provided to battery 411 can be greater than the quantity of heat extracted from reservoir 417.

In some examples, heating can be provided to building 490 with a duty cycle of less than 100%, and the operating mode of FIG. 13 can be interleaved with other operating modes in which heat is delivered to the building 490. The operating mode of FIG. 13 can have greater efficiency than other methods or operating modes for recharging the battery 411.

XVI. Further Example Features

1. PCM Materials

A common PCM is hydrated $CaCl_2$. The critical temperature can be tuned by adjusting the degree of hydration and adding other inorganic compounds. Other inorganic salts such as $MgCl_2$ can also exhibit advantageous PCM properties. Water can also be used in examples where 0° C. is within an operating temperature range of a disclosed thermal battery or reservoir.

2. PCM Structures

Various different form factors for PCM can be used with the disclosed technologies. In some examples, a PCM can be encapsulated in closed cells, as a closed cell foam, as individual capsules, as structured sheets similar to bubble wrap, or in a matrix of a sheet material. In other examples, PCM can be packed as a powder, with or without thermally conductive filler material, into a hermetically sealed frame.

3. PCM Heat Capacity

In addition to providing thermal regulation, PCM with a suitable critical temperature can improve the capacity of a thermal battery. For example, replacement of 10% of a thermal battery internal fluid volume with a same volume of PCM can increase the heat capacity of the battery (between two fixed temperature points bracketing the critical temperature) by about 50%. That is, PCM can have up to 6 times the heat capacity as an equivalent volume of water over a given operating temperature range.

4. Operating Temperatures

In many populated areas of the United States and other countries, mean underground temperatures between 5-25° C. are encountered. For a cooling application, a reservoir can be designed for a maximum operating temperature of about 25-35° C., or about 10-20° C. above the mean underground temperature. In instances where the reservoir temperature is regulated by PCM, the PCM critical temperature and the maximum operating temperature can be selected to be within a threshold of 5.0° C., 7.0° C., or 10.0° C. from each other. The thermal battery can have a wider operating temperature range which can extend well below the mean underground temperature. In some examples, chilled water of about 7° C. can be used to recharge the thermal battery, but there can be considerable variation. Battery recharging fluid temperatures in a range from −10 to 5° C. can be used, where antifreeze mixtures can be used in a fluid loop where ambient air or chilled fluid temperatures below 0° C. are likely to be encountered. The temperature of a recharging fluid can set a lower limit on battery temperature range, while an upper limit can be set by usefulness of the stored cold. That is, for an air conditioning application, it can be desirable to have battery temperature maintained at least about 5° C. below a maximum target temperature of a load building. For representative Tennessee conditions described herein, a maximum battery temperature of about 13° C. can be suitable. In some examples, cool air from a fan such as 491 can be provided for space cooling at about 13° C., or in a range of about 10-16° C., or about 5-21° C.

For a heating application, similar temperature spreads can be employed. A reservoir can be designed for a minimum operating temperature of about 1-8° C., or about 5-10° C. below the mean underground temperature, and a PCM critical temperature can be chosen accordingly. The thermal battery can have a wider operating temperature range which can extend well above the mean underground temperature. In some examples, heated water of about 55° C. can be used to recharge the thermal battery, but there can be considerable variation. Battery recharging fluid temperatures in a range from 30 to 80° C. can be used. The temperature of a recharging fluid can set an upper limit on battery temperature range, while a lower limit can be set by usefulness of the stored heat. That is, for a heating application, it can be desirable to have battery temperature maintained at least about 5° C. above a minimum target temperature of a load building. For representative Tennessee conditions described herein, a minimum battery temperature of about 35-40° C. can be suitable. In some examples, warm air from a fan such as 491 can be provided for space heating at about 35° C., or in a range of about 32-38° C., or about 28-42° C.

XVII. A Generalized Computer Environment

Figure 14:
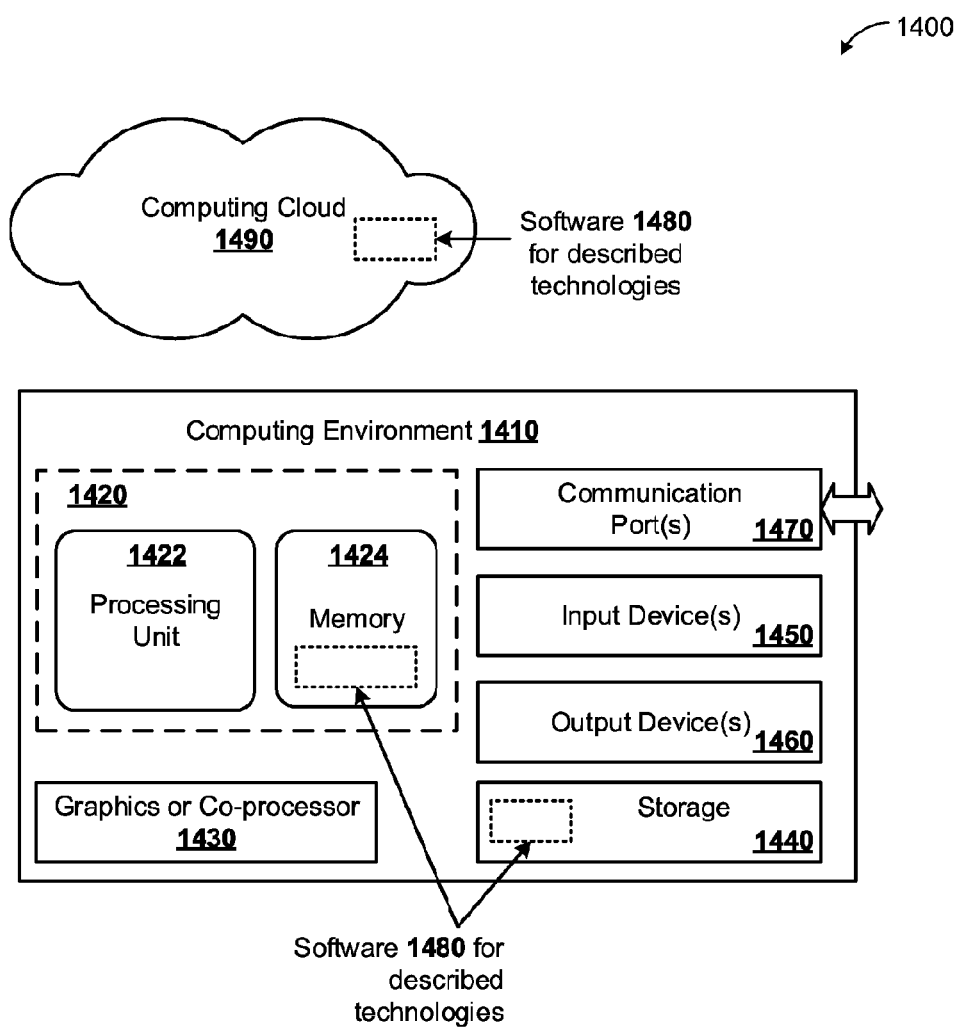
FIG. 14 illustrates a generalized example of a suitable computing environment in which described embodiments, techniques, and technologies pertaining to a disclosed thermal storage system can be implemented.

FIG. 14 illustrates a generalized example of a suitable computing system 1400 in which described examples, techniques, and technologies for a dual tank thermal storage can be implemented. The computing system 1400 is not intended to suggest any limitation as to scope of use or functionality of the present disclosure, as the innovations can be implemented in diverse general-purpose or special-purpose computing systems. The computing system 1400 can control a disclosed battery, reservoir, heat pump or associated fluid loops, or can implement a monitor or controller for a disclosed thermal storage system, or other entity described herein; or can acquire, process, output, or store data associated with energy delivery to a load, or other equipment or activities described herein.

With reference to FIG. 14, computing environment 1410 includes one or more processing units 1422 and memory 1424. In FIG. 14, this basic configuration 1420 is included within a dashed line. Processing unit 1422 can execute computer-executable instructions, such as for control or data acquisition as described herein. Processing unit 1422 can be a general-purpose central processing unit (CPU), a processor in an application-specific integrated circuit (ASIC), or any other type of processor. In a multi-processing system, multiple processing units execute computer-executable instructions to increase processing power. Computing environment 1410 can also include a graphics processing unit or co-processing unit 1430. Tangible memory 1424 can be volatile memory (e.g., registers, cache, or RAM), non-volatile memory (e.g., ROM, EEPROM, or flash memory), or some combination thereof, accessible by processing units 1422, 1430. The memory 1424 stores software 1480 implementing one or more innovations described herein, in the form of computer-executable instructions suitable for execution by the processing unit(s) 1422, 1430. The memory 1424 can also store control parameters, performance data, energy demand data, weather forecasts, or database data. The memory 1424 can also store configuration and operational data.

A computing system 1410 can have additional features, such as one or more of storage 1440, input devices 1450, output devices 1460, or communication ports 1470. An interconnection mechanism (not shown) such as a bus, controller, or network interconnects the components of the computing environment 1410. Typically, operating system software (not shown) provides an operating environment for other software executing in the computing environment 1410, and coordinates activities of the components of the computing environment 1410.

The tangible storage 1440 can be removable or non-removable, and includes magnetic disks, magnetic tapes or cassettes, CD-ROMs, DVDs, or any other medium which can be used to store information in a non-transitory way and which can be accessed within the computing environment 1410. The storage 1440 stores instructions of the software 1480 (including instructions and/or data) implementing one or more innovations described herein. Storage 1440 can also store energy demand data, predicted energy demand data, weather forecasts, performance data, configuration data, or other databases or any data or data structures described herein.

The input device(s) 1450 can be a mechanical, touch-sensing, or proximity-sensing input device such as a keyboard, mouse, pen, touchscreen, or trackball, a voice input device, a scanning device, or another device that provides input to the computing environment 1410. The output device(s) 1460 can be a display, printer, speaker, optical disk writer, or another device that provides output from the computing environment 1410. Input or output can also be communicated to/from a remote device over a network connection, via communication port(s) 1470.

The communication port(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1400 can also include a computing cloud 1490 in which instructions implementing all or a portion of the disclosed technology are executed. Any combination of memory 1424, storage 1440, and computing cloud 1490 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computing system," "computing environment," and "computing device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

XVIII. General Considerations

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the terms "or" or "and/or" mean any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "charge," "configure," "control," "deliver," "determine," "discharge," "evaluate," "extract," "generate," "optimize," "perform," "produce," "provide," "receive," "send," "transmit," and to describe the disclosed methods. These terms are high-level descriptions of the actual operations that can be performed by or managed by a computer executing software. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, Julia, Lisp, Matlab, Octave, Perl, Python, Qt, R, Ruby, SAS, SPSS, SQL, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to a battery controller or another computing device.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims and their equivalents.

We claim:

1. A method of operating an apparatus comprising a thermal reservoir, a heat pump, and a thermal battery, the heat pump coupled to receive energy from the thermal reservoir and to provide energy to a building, the thermal battery coupled to receive energy from the heat pump and to provide energy to the building, the thermal battery being further coupled to transfer energy to or from the thermal reservoir, and the method comprising:
    (a) determining, for a first time period, that an energy load of the building is less than a capacity of the heat pump;
    (b) responsive to operation (a), configuring one or more fluid loops to provide energy from the heat pump to the energy load and to the thermal battery during the first time period;
    (c) determining that a second time period is a period of peak electricity usage;
    (d) responsive to operation (c), configuring the one or more fluid loops to provide energy from the thermal battery to the energy load during the second time period;
    (e) determining, for a third time period, that available energy in the thermal battery is below a threshold; and
    (f) responsive to operation (e), configuring the one or more fluid loops to provide energy from the heat pump to the energy load during the third time period.

2. The method of claim 1, wherein the first, second, and third time periods are distinct time periods during one 24-hour day.

3. The method of claim 2, wherein the one 24-hour day is a first day, the energy load is a cooling load, and further comprising:
    repeating operations (a)-(f) on a second day distinct from the first day, when the energy load is a heating load.

4. The method of claim 1, wherein operations (a) and (e) are performed during the first and third time periods respectively.

5. The method of claim 1, wherein operation (d) further comprises configuring the heat pump to be off.

6. The method of claim 1, wherein operation (f) further comprises configuring the one or more fluid loops to disable energy transfer to or from the thermal battery during the third time period.

7. The method of claim 1, wherein the energy load is a cooling load or a heating load, the threshold is a first threshold, and the method further comprises:
    (g) determining, for a case that the energy load is a cooling load, that an ambient air temperature is above a second threshold, or, for a case that the energy load is a heating load, that an ambient air temperature is below a third threshold; and
    (h) responsive to operation (g), configuring the one or more fluid loops to provide energy from the thermal reservoir to the heat pump during the first time period or the third time period.

8. The method of claim 1, wherein the threshold is a first threshold, and further comprising:
    (i) determining, during the first time period, that a charge state of the thermal battery is above a second threshold; and
    (j) responsive to operation (i), reconfiguring the one or more fluid loops to disable energy transfer to the thermal battery for a subsequent portion of the first time period.

9. The method of claim 1, wherein the threshold is a first threshold, and further comprising:
    (k) determining, during the second time period, that a charge state of the thermal battery is below a second threshold; and
    (l) responsive to operation (k), reconfiguring the one or more fluid loops, for a subsequent portion of the second time period, to disable energy transfer from the thermal battery to the energy load and to enable energy transfer from the heat pump to the energy load.

10. One or more computer-readable media storing instructions which, when executed by one or more hardware processors, cause a system comprising the one or more hardware processors, the heat pump, the thermal battery, and the one or more fluid loops to perform the method of claim 1.

* * * * *